United States Patent
Hakola et al.

(10) Patent No.: US 12,184,360 B2
(45) Date of Patent: *Dec. 31, 2024

(54) USER DEVICE BEAMFORMING TRAINING IN WIRELESS NETWORKS

(71) Applicant: NOKIA SOLUTIONS AND NETWORKS OY, Espoo (FI)

(72) Inventors: Sami-Jukka Hakola, Kempele (FI); Esa Tapani Tiirola, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 17/305,699

(22) Filed: Jul. 13, 2021

(65) Prior Publication Data

US 2021/0344385 A1 Nov. 4, 2021

Related U.S. Application Data

(63) Continuation of application No. 15/777,903, filed as application No. PCT/EP2015/077325 on Nov. 23, 2015, now Pat. No. 11,101,851.

(51) Int. Cl.
*H04B 7/0417* (2017.01)
*H04B 7/06* (2006.01)
(Continued)

(52) U.S. Cl.
CPC ........ *H04B 7/0417* (2013.01); *H04B 7/0617* (2013.01); *H04W 36/0016* (2013.01);
(Continued)

(58) Field of Classification Search
CPC .......... H04B 7/0417; H04W 36/00837; H04W 36/0016; H04W 36/04; H04W 72/046; H04W 72/085; H04W 74/0833
See application file for complete search history.

(56) References Cited

U.S. PATENT DOCUMENTS 6,233,466 B1 * 5/2001 Wong ..................... H01Q 1/246
455/562.1
7,627,348 B2 12/2009 Lysejko et al.
(Continued)

FOREIGN PATENT DOCUMENTS

KR   20130100733 A   9/2013
KR   101563469 B1   10/2015
(Continued)

OTHER PUBLICATIONS

3GPP TS 36.213 V12.7.0 (Sep. 2015); 3rd Generation Partnership Project; Technical Specification Group Radio Access Network; Evolved Universal Terrestrial Radio Access (E-UTRA); Physical Layer Procedures (Release 12); Sophia Antipolis, France; Sep. 2015; 165 pages.
(Continued)

*Primary Examiner* — Samina F Choudhry
(74) *Attorney, Agent, or Firm* — Brake Hughes Bellermann LLP

(57) ABSTRACT

A technique is provided for beamforming training, including: transmitting, by a network node, common control signaling via a plurality of beams periodically according to a predetermined beam sweeping pattern, and transmitting, via a set of one or more beams in each of one or more sequential time-domain resources, an aperiodic downlink sounding burst to at least one user device to allow the at least one user device to perform beamforming training.

21 Claims, 10 Drawing Sheets

(51) Int. Cl.
| | |
|---|---|
| *H04W 36/00* | (2009.01) |
| *H04W 36/04* | (2009.01) |
| *H04W 72/044* | (2023.01) |
| *H04W 72/542* | (2023.01) |
| *H04W 74/0833* | (2024.01) |

(52) U.S. Cl.
CPC ......... *H04W 36/04* (2013.01); *H04W 72/046* (2013.01); *H04W 72/542* (2023.01); *H04W 74/0833* (2013.01); *H04B 7/0695* (2013.01)

(56) References Cited

U.S. PATENT DOCUMENTS

| | | | |
|---|---|---|---|
| 8,116,694 | B2 | 2/2012 | Kaaja et al. |
| 8,165,185 | B2 | 4/2012 | Zhang et al. |
| 8,335,167 | B1 | 12/2012 | Zhang et al. |
| 8,422,961 | B2 | 4/2013 | Kafle |
| 8,503,928 | B2 | 8/2013 | Wang et al. |
| 9,100,074 | B1 | 8/2015 | Zhang et al. |
| 9,331,767 | B1 | 5/2016 | Thomas et al. |
| 10,484,062 | B2 | 11/2019 | Xiong et al. |
| 2009/0318091 | A1 | 12/2009 | Wang et al. |
| 2010/0054223 | A1 | 3/2010 | Zhang et al. |
| 2010/0190450 | A1 | 7/2010 | Stirling-Gallacher et al. |
| 2010/0215027 | A1 | 8/2010 | Liu et al. |
| 2010/0265924 | A1 | 10/2010 | Yong et al. |
| 2011/0064033 | A1 | 3/2011 | Gong et al. |
| 2011/0149918 | A1 | 6/2011 | Gong et al. |
| 2012/0113967 | A1 | 5/2012 | Smith et al. |
| 2013/0102345 | A1 | 4/2013 | Jung |
| 2013/0201938 | A1* | 8/2013 | Seol .................. H04W 72/0406 370/329 |
| 2013/0223554 | A1 | 8/2013 | Hong et al. |
| 2013/0272220 | A1 | 10/2013 | Li et al. |
| 2013/0286960 | A1 | 10/2013 | Li et al. |
| 2013/0301454 | A1 | 11/2013 | Seol et al. |
| 2013/0315325 | A1 | 11/2013 | Wang et al. |
| 2014/0036859 | A1 | 2/2014 | Ekpenyong et al. |
| 2014/0056256 | A1 | 2/2014 | Kim et al. |
| 2014/0073329 | A1 | 3/2014 | Kang et al. |
| 2014/0098912 | A1 | 4/2014 | Yin et al. |
| 2014/0126567 | A1 | 5/2014 | Husain et al. |
| 2014/0185481 | A1 | 7/2014 | Seol et al. |
| 2014/0286305 | A1* | 9/2014 | Yamada ................ H04W 74/02 370/329 |
| 2014/0307654 | A1* | 10/2014 | Kim ..................... H04B 7/0617 370/329 |
| 2014/0334566 | A1 | 11/2014 | Kim et al. |
| 2015/0009951 | A1 | 1/2015 | Josiam et al. |
| 2015/0009968 | A1 | 1/2015 | Yu et al. |
| 2015/0208443 | A1 | 7/2015 | Jung et al. |
| 2015/0257073 | A1 | 9/2015 | Park et al. |
| 2015/0280802 | A1 | 10/2015 | Thomas et al. |
| 2015/0304994 | A1* | 10/2015 | Kim ..................... H04L 27/2601 370/280 |
| 2015/0333811 | A1 | 11/2015 | Yu et al. |
| 2015/0341105 | A1 | 11/2015 | Yu et al. |
| 2015/0382268 | A1 | 12/2015 | Hampel et al. |
| 2016/0006122 | A1 | 1/2016 | Seol et al. |
| 2016/0021548 | A1 | 1/2016 | Raghavan et al. |
| 2016/0043781 | A1 | 2/2016 | Cho et al. |
| 2016/0065287 | A1 | 3/2016 | Kim et al. |
| 2016/0099763 | A1 | 4/2016 | Chen |
| 2016/0119043 | A1 | 4/2016 | Rajagopal et al. |
| 2016/0269158 | A1 | 9/2016 | Soriaga et al. |
| 2016/0285583 | A1 | 9/2016 | Kasher et al. |
| 2016/0323075 | A1 | 11/2016 | Jeong et al. |
| 2016/0323898 | A1 | 11/2016 | Jo et al. |
| 2017/0033854 | A1 | 2/2017 | Yoo |
| 2019/0007116 | A1 | 1/2019 | Chang et al. |
| 2019/0013857 | A1 | 1/2019 | Zhang et al. |

FOREIGN PATENT DOCUMENTS

| | | | |
|---|---|---|---|
| WO | 2014208844 A1 | 12/2014 | |
| WO | WO-2015045697 A1 * | 4/2015 | ............. H04B 7/026 |
| WO | 2015172836 A1 | 11/2015 | |
| WO | 2016068521 A1 | 5/2016 | |

OTHER PUBLICATIONS

3GPP TSG RAN WG1 Meeting #82, R1-154324; "Support for Carrier Selection/Switching in CA Enhancement;" Agenda Item: 7.2.2.3; Source: Huawei, HiSilicon; Beijing, China; Aug. 24-28, 2015, 8 pages.

3GPP TSG RAN WG1 Meeting #82, R1-154974; "WF on LAA Cell Detection and Synchronization", Agenda item: 7.2.4.3; Huawei, NTT DOCOMO; Beijing, China; Aug. 24-28, 2015; 2 pages.

Jeong et al., "Random Access in Millimeter-Wave Beamforming Cellular Networks: Issues and Approaches"; Millimeter-Wave Communications for 5G; IEEE Communications Magazine; Jan. 2015; pp. 180-185.

"Part 15.3: Wireless Medium Access Control (MAC) and Physical Layer (PHY) Specifications for High Rate Wireless Personal Area Networks (WPANs)", IEEE Computer Society; IEEE Std 802.15. 3c, Oct. 12, 2009, 203 pages.

Feng et al., "Circular-Antenna-Array-Based Codebook Design and Training Method for 60GHz Beamforming", IEEE Wireless Communications and Networking Conference (WCNC): PHY, Apr. 7-10, 2013, pp. 4140-4145.

Gao et al., "Multi-Device Multi-Path Beamforming Training for 60-GHz Millimeter-Wave Communications", IEEE ICC 2015 SAC— Millimeter-wave Communications, Jun. 8-12, 2015, pp. 1328-1333.

Kim et al., "Fast Millimeter-Wave Beam Training with Receive Beamforming", Journal of Communications and Networks, vol. 16, No. 5, Oct. 2014, pp. 512-522.

Perahia et al., "Gigabit Wireless LANs: An Overview of IEEE 802.11ac and 802.11ad", ACM SIGMOBILE Mobile Computing and Communications Review, vol. 15, Issue 3, Jul. 2011, pp. 23-33.

Tsang et al., "Coding the Beams: Improving Beamforming Training in mmWave Communication System", IEEE Global Telecommunications Conference—GLOBECOM 2011, Dec. 5-9, 2012, 6 pages.

Tsang et al., "Fast Beam Training for mmWave Communication System: from Algorithm to Circuits", mmCom '10: Proceedings of the 2010 ACM International Workshop on mmWave Communications: from circuits to networks, Sep. 24, 2010, pp. 27-31.

Wang et al., "Beam Codebook Based Beamforming Protocol for Multi-Gbps Millimeter-Wave WPAN Systems", IEEE Journal on Selected Areas in Communications, vol. 27, No. 8, Oct. 2009, pp. 1390-1399.

U.S. Appl. No. 15/777,903, filed May 22, 2018, Allowed.

IEEE Std 802.11ad—2012, Part 11: Wireless LAN Medium Access Control (MAC) and Physical Layer (PHY) Specifications, Amendment 3: Enhancements for Very High Throughput in the 60 GHz Band; Dec. 28, 2012, 630 pages.

International Search Report and Written Opinion for International Application PCT/EP2015/077325, dated Aug. 12, 2016, 13 pages.

Office Action for European Application No. 15816371.7, dated May 19, 2020, 7 pages.

Office Action for European Application No. 15816371.7, dated May 26, 2021, 5 pages.

Office Action for Indian Application No. 201817017489, dated Aug. 5, 2020, 7 pages.

Zhou et al., "Efficient Codebook-Based MIMO Beamforming for Millimeter-Wave WLANs"; 2012 IEEE 23rd International Symposium on Personal, Indoor and Mobile Radio Communications, Sep. 12, 2012, pp. 1885-1889.

Office Action for European Patent Application No. 15816371.7, dated Apr. 14, 2023, 6 pages.

Schulz, Bernhard; "LTE Transmission Modes and Beamformin" (White Paper); Rohde & Schwarz; Munich, Germany; Jul. 25, 2015; 25 pages.

(56) References Cited

OTHER PUBLICATIONS

Communication pursuant to Article 94(3) EPC for European Patent Application No. 15816371.7, mailed on Aug. 27, 2024, 6 pages.

* cited by examiner

USER DEVICE BEAMFORMING TRAINING IN WIRELESS NETWORKS

CROSS-REFERENCE TO RELATED APPLICATIONS

This is a continuation patent application of U.S. application Ser. No. 15/777,903, filed May 22, 2018, entitled "USER DEVICE BEAMFORMING TRAINING IN WIRELESS NETWORKS" which is a national stage entry of International Application No. PCT/EP2015/077325, filed Nov. 23, 2015, entitled "USER DEVICE BEAMFORMING TRAINING IN WIRELESS NETWORKS", both of which are hereby incorporated by reference in their entireties.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, above 6 GHz. For fifth generation wireless systems (5G), an access architecture for deployment of cellular radio equipment employing mmWave radio spectrum has been proposed. Other example spectrums may also be used, such as cmWave radio spectrum (3-30 GHz).

SUMMARY

According to an example implementation, a method may include transmitting, by a network node, common control signaling via a plurality of beams periodically according to a predetermined beam sweeping pattern; and transmitting, via a set of one or more beams in each of one or more sequential time-domain resources, an aperiodic downlink sounding burst to at least one user device to allow the at least one user device to perform beamforming training.

According to another example implementation, an apparatus may include at least one processor and at least one memory including computer instructions, when executed by the at least one processor, cause the apparatus to: transmit, by a network node, common control signaling via a plurality of beams periodically according to a predetermined beam sweeping pattern; and transmit, via a set of one or more beams in each of one or more sequential time-domain resources, an aperiodic downlink sounding burst to at least one user device to allow the at least one user device to perform beamforming training.

According to another example implementation, a computer program product may include a computer-readable storage medium and storing executable code that, when executed by at least one data processing apparatus, is configured to cause the at least one data processing apparatus to perform a method including: transmitting, by a network node, common control signaling via a plurality of beams periodically according to a predetermined beam sweeping pattern; and transmitting, via a set of one or more beams in each of one or more sequential time-domain resources, an aperiodic downlink sounding burst to at least one user device to allow the at least one user device to perform beamforming training.

According to another example implementation, an apparatus may include means for transmitting, by a network node, common control signaling via a plurality of beams periodically according to a predetermined beam sweeping pattern; and means for transmitting, via a set of one or more beams in each of one or more sequential time-domain resources, an aperiodic downlink sounding burst to at least one user device to allow the at least one user device to perform beamforming training.

According to an example implementation, a method includes receiving, by a user device from a network node, common control signaling via a plurality of beams periodically according to a predetermined beam sweeping pattern; receiving, via a set of one or more beams in each of a plurality of sequential time-domain resources, an aperiodic downlink sounding burst; switching, by the user device, to a different receive beam for each of the sequential time-domain resources; and selecting, by the user device based on the received downlink sounding burst in each of the plurality of sequential time-domain resources, one or more beams to use for transmitting signals to or receiving signals from to the network node.

According to another example implementation, an apparatus may include at least one processor and at least one memory including computer instructions, when executed by the at least one processor, cause the apparatus to: receive, by a user device from a network node, common control signaling via a plurality of beams periodically according to a predetermined beam sweeping pattern; receive, via a set of one or more beams in each of a plurality of sequential time-domain resources, an aperiodic downlink sounding burst; switch, by the user device, to a different receive beam for each of the sequential time-domain resources; and select, by the user device based on the received downlink sounding burst in each of the plurality of sequential time-domain resources, one or more beams to use for transmitting signals to or receiving signals from to the network node.

According to another example implementation, a computer program product may include a computer-readable storage medium and storing executable code that, when executed by at least one data processing apparatus, is configured to cause the at least one data processing apparatus to perform a method including: receiving, by a user device from a network node, common control signaling via a plurality of beams periodically according to a predetermined beam sweeping pattern; receiving, via a set of one or more beams in each of a plurality of sequential time-domain resources, an aperiodic downlink sounding burst; switching, by the user device, to a different receive beam for each of the sequential time-domain resources; and selecting, by the user device based on the received downlink sounding burst in each of the plurality of sequential time-domain resources, one or more beams to use for transmitting signals to or receiving signals from to the network node.

According to another example implementation, an apparatus may include means for receiving, by a user device from a network node, common control signaling via a plurality of beams periodically according to a predetermined beam sweeping pattern; means for receiving, via a set of one or more beams in each of a plurality of sequential time-domain resources, an aperiodic downlink sounding burst; means for switching, by the user device, to a different receive beam for each of the sequential time-domain resources; and, means for selecting, by the user device based on the received downlink sounding burst in each of the plurality of sequential time-domain resources, one or more beams to use for transmitting signals to or receiving signals from to the network node.

The details of one or more examples of implementations are set forth in the accompanying drawings and the description below. Other features will be apparent from the description and drawings, and from the claims.

DETAILED DESCRIPTION

Figure 1:
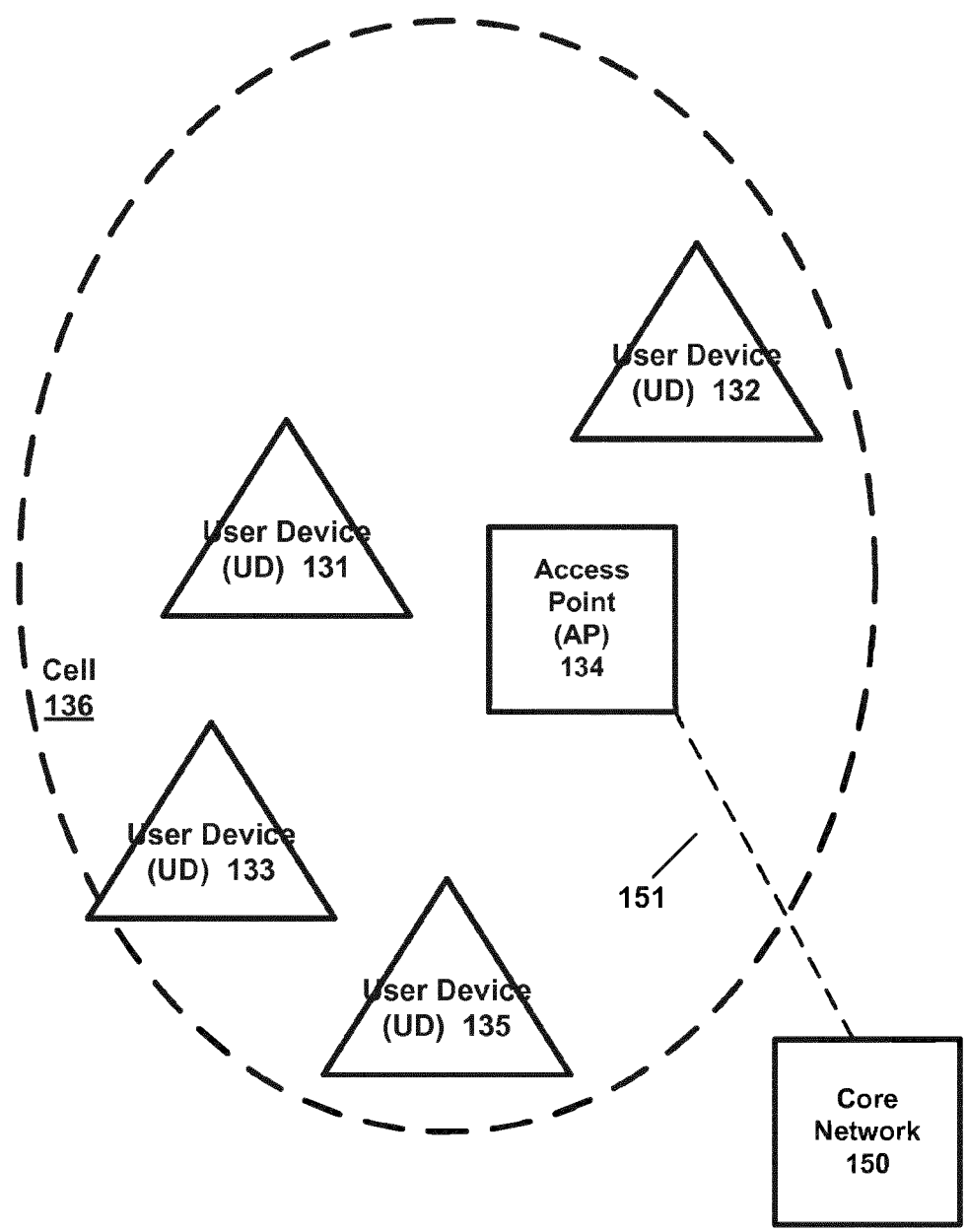
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with an access point (AP), which may also be referred to as a base station (BS), an enhanced Node B (eNB) or a network node. At least part of the functionalities of an access point (AP), base station (BS) or (e) Node B (eNB) may also be carried out by any node, server or host which may be operably coupled to a transceiver, such as a remote radio head. AP 134 provides wireless coverage within a cell 136, including to user devices 131, 132, 133 and 135. Although only four user devices are shown as being connected or attached to AP 134, any number of user devices may be provided. AP 134 is also connected to a core network 150 via a 51 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies or wireless networks, such as LTE, LTE-A, 5G, cmWave, and/or mmWave band networks, or any other wireless network. LTE, 5G, cmWave and mmWave band networks are provided only as illustrative examples, and the various example implementations may be applied to any wireless technology/wireless network.

Figure 2:
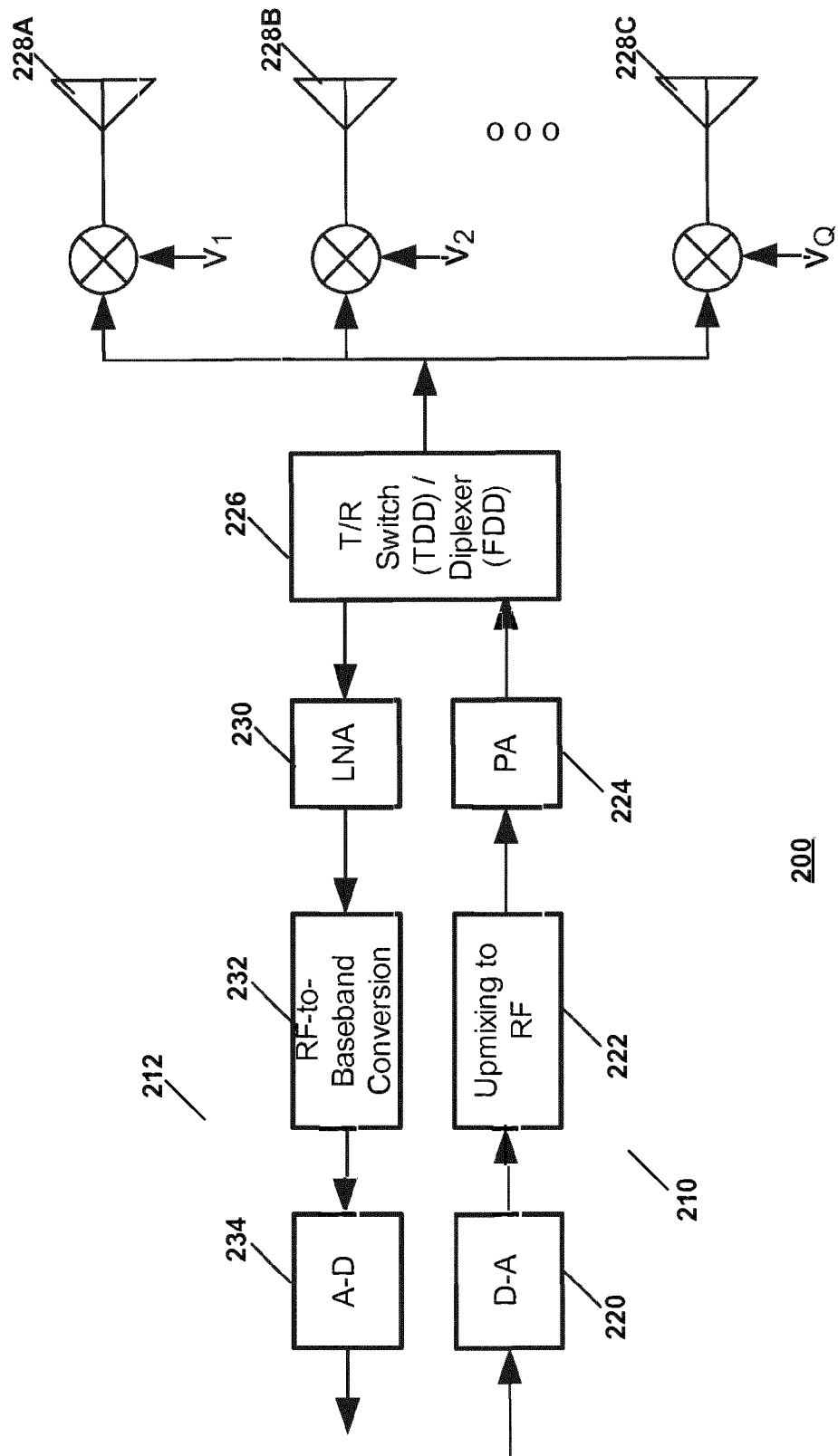
FIG. 2 is a diagram of a wireless transceiver according to an example implementation.

FIG. 2 is a diagram of a wireless transceiver according to an example implementation. Wireless transceiver 200 may be used, for example, at a base station (BS), e.g., Access Point (AP) or eNB, or other wireless device. Wireless transceiver 200 may include a transmit path 210 and a receive path 212.

In transmit path 210, a digital-to-analog converter (D-A) 220 may receive a digital signal from one or more applications and convert the digital signal to an analog signal. Upmixing block 222 may up-convert the analog signal to an RF (e.g., radio frequency) signal. Power amplifier (PA) 224 then amplifies the up-converted signal. According to an example implementation, the power amplifier may be integrated to or with an antenna element. The amplified signal is then passed through a transmit/receive (T/R) switch (or Diplexer 226 for frequency division duplexing, to change frequencies for transmitting). The signal output from T/R switch 226 is then output to one or more antennas in an array of antennas 228, such as to antenna 228A, 228B and/or 228C. Prior to being transmitted by one or more of the antennas in the array of antennas 228, a set of beam weights V1, V2, . . . or VQ is mixed with the signal to apply a gain and phase to the signal for transmission. For example, a gain and phase, V1, V2, . . . or VQ, may be applied to the signal output from the T/R switch 226 to scale the signal transmitted by each antenna (e.g., the signal is multiplied by V1 before being transmitted by antenna 1 228A, the signal is multiplied by V2 before being transmitted by antenna 2 228B, and so on), where the phase may be used to steer or point a beam transmitted by the overall antenna array, e.g., for directional beam steering. Thus, the beam weights V1, V2, . . . or VQ (e.g., each beam weight including a gain and/or phase) may be a set of transmit beamforming beam weights when applied at or during transmission of a signal to transmit the signal on a specific beam, and may be a set of receive beamforming beam weights when applied to receive a signal on a specific beam.

In receive path 212 of wireless transceiver 200, a signal is received via an array of antennas 228, and is input to T/R switch 226, and then to low noise amplifier (LNA) 230 to amplify the received signal. According to an example implementation, the LNA may be co-located with an antenna element. The amplified signal output by LNA 230 is then input to a RF-to-baseband conversion block 232 where the amplified RF signal is down-converted to baseband. An analog-to-digital (A-D) converter 234 then converts the analog baseband signal output by conversion block 232 to a digital signal for processing by one or more upper layers/application layers.

Various example implementations may relate, for example, to 5G radio access systems (or other systems) with support for Massive MIMO (multiple input, multiple output) and optimized for operating in high carrier frequencies such as cmWave frequencies (e.g. from 3 GHz onwards) or mmWave frequencies, as examples, according to an illustrative example implementation. Those illustrative systems are typically characterized by the need for high antenna gain to compensate for increased pathloss and by the need for high capacity and high spectral efficiency to respond to ever increasing wireless traffic. According to an example implementation, the increased attenuation at higher carrier frequencies may, for example, be compensated by introducing massive (multi-element) antenna arrays and correspondingly antenna gain via beamforming at the access point (AP)/base station (BS) and/or user device. The spectral efficiency may typically improve with the number spatial streams the system can support and thus with the number of antenna ports at the AP/BS.

In an example implementation, A TX (transmit) beam may correspond to an antenna port. Typically, the needed TX beam resolution may depend on the number of antenna elements. For example, if the number of antenna elements is low, then the number of beams is also low, and if the number of antenna elements is high, then there is a need for a higher number of beams, according to an illustrative example implementation.

According to an example implementation, techniques are described for user device/UE beamforming training in a wireless network. In illustrative example implementations, beamforming training may be performed in a cellular wireless network with multiple user devices. According to an example implementation, a downlink beam search signal burst, which may be referred to as a downlink sounding burst, is triggered (caused to occur) or initiated based on one of a plurality of triggers/triggering methods. The downlink sounding burst may allow a user device to perform beamforming training.

According to an example implementation, an access point/AP (or other network node) may transmit common control signaling via each of a plurality of beams periodically according to a predetermined beam sweeping pattern. Common control signaling refers to control signaling transmitted to all (or at least multiple) user device/UEs within a cell of wireless network. The common control signaling may provide a discovery signal that is transmitted by the AP via the different beams at predetermined time instants, according to an example implementation. For example, an access point may periodically transmit common control signaling for cell specific beams that allows user devices/UEs to detect a cell and corresponding cell specific beams.

According to an example implementation, the common control signaling that is periodically transmitted via each of the plurality of beams may include one or more of the following: 1) synchronization signals, such as primary synchronization signals (PSS) and/or secondary synchronization signals (SSS), which may be used by a user device to determine symbol timing, frame timing and cell identity; 2) a physical broadcast control channel (PBCH) which may include, for example, parameters used for the initial access of the cell such as a downlink system bandwidth, a channel structure, cell specific beam transmission structure indicating how many cell specific beams cell are transmitted in total per one sweep period and how many cell specific beams are transmitted in parallel, and/or part of a system frame number; and, 3) cell specific reference signals (CSI-RS signals) that may also identify a specific beam by including a beam ID, which may be provided as a combination of a timestamp plus an antenna port number (identifying an AP's antenna port associated with the beam), for example. Therefore, in an illustrative example implementation, the common control signaling may include one or more of the synchronization signals, the physical broadcast control channel (PBCH) signals and/or the cell specific reference signals (CSI-RS) that may provide a beam ID or beam identification information.

Each UE may receive the common control signaling via one or more of the periodically transmitted beams from the AP or network node, and may determine a best set of one or more AP beams/antenna ports based on the control channel signaling received via the one or more beams. For example, a UE may measure the cell specific reference signals (CSI-RS) received via one or more beams, and may determine the strongest or best set of N AP/network node beams (e.g., the best set of N beams transmitted by the AP) for the UE based on these signals. The UE may signal the best set of N AP beams for the UE to the AP. The signaling may be conveyed explicitly or implicitly (or a combination of them).

One of a plurality of triggers/triggering methods may cause the AP to transmit, via a set of one or more beams (e.g., via a set of the N best AP beams identified by the user device) in each of a plurality of sequential time domain resources, an aperiodic downlink sounding burst (e.g., which may be initiated/transmitted upon request/demand) to at least one UE to allow the at least one UE to perform beamforming training for its receive (RX) and/or transmit (TX) beams. The beams in which the aperiodic downlink sounding burst is transmitted may be one or more of the plurality of beams in which the common control signaling was transmitted. In an example implementation, the UE may apply one or more receive beams to receive the downlink sounding burst, in order to determine the UE's best receive beam(s) for communicating with the AP. The wireless uplink (UL) and downlink (DL) channels between the AP and the UE may typically be reciprocal. This reciprocal nature of the channel may be true for various channel arrangements, such as, for example, time division duplexing (TDD) mode where the wireless receiver and transmitter may operate on the same frequency band. There can also be significant channel correlation in at least certain properties of UL and DL band also in the case of frequency division duplexing (FDD)

where receiver and transmitter operate on different frequency bands. For example, direction of arrival information (DoA) measured from downlink (DL) band may correlate well with the DoA in the uplink (UL) band. Therefore, by determining the UE's best set of one or more receive (RX) beams, the UE may use this information to determine the UE's best set of transmit (TX) beams for transmitting to the AP/network node, for example. However, in one embodiment, the TX and RX beams may not be the same in all cases. For example, if the traffic is DL heavy, it may be beneficial to aim at good angular resolution in DL side, e.g., in order to maximize DL rank. Thus, the UE may be able to train both beams separately. For example, the transmit (TX) beams may be trained by forming receive (RX) beams to be as potential TX beams. In one embodiment, the RX beams may be trained with different beam configurations (e.g., such as wider beams, narrower beams, etc.). To provide robustness for downlink control channel reception, and on the other hand to provide higher possibility for higher spatial multiplexing degree in downlink, the UE may operate using wider RX beam width, while for uplink transmission the UE may use a narrower TX beam width to obtain enough high EIRP (equivalent isotropically radiated power), for example. The network deployment may typically be dimensioned so that downlink link budget at cell edge can be met with omni-directional RX beam(s).

Therefore, an AP may first transmit common control signaling via each of a plurality of beams periodically according to a beam sweeping pattern. A UE may determine a best set of N (e.g., one or more) AP beams based on the received signals and may notify the AP of the best set of NAP beams (beams applied by the AP to transmit the common control signaling). The AP or network node, upon occurrence of a trigger, may schedule a plurality of (or one or more) sequential time domain resources. The AP may then transmit, via a set of (e.g., a set of N best beam(s)) of one or more beams in each resource of the set of sequential time-domain resources, an aperiodic (e.g., upon demand/occurrence of a trigger) downlink sounding burst to the UE(s) to allow the UE(s) to perform beamforming training. Thus, the AP may repeatedly transmit the same downlink sounding burst for the set of beam(s) via each scheduled downlink resource within the set of sequential time-domain resources, e.g., to allow a UE(s) to test each of a plurality of receive beams, and determine a best receive beam(s) for receiving signals from/communicating with the AP. In this manner, the UE may determine it best receive beam(s) for receiving signals from the AP. And, based on the best receive beam(s), the UE may also determine its best transmit beam(s) for transmitting to the AP, e.g., due to the reciprocal nature of the UE→AP (uplink) wireless channel as compared to the AP→UE (downlink) wireless channel.

Various techniques may be used by the AP/network node to determine a set of one or more DL beams that the AP should use for transmitting the downlink sounding burst to the UE. In a first illustrative example, the UE may signal or indicate a set of beams (e.g., best set of beams) to the AP that the AP should use as TX beams for transmitting the DL sounding burst. In a second illustrative example, information may be provided, e.g., implicitly within the random access preamble and related timing, in order to identify a set of beams. More detailed information related to the UE's best DL beam could be determined by the AP based on UL signal measurement (by AP). In yet another example implementation, the UE may transmit a signal, e.g., a random access (RACH) preamble with omnidirectional beam pattern or with random beamforming weights. The AP may then determine the direction of arrival of UE's signal (e.g., direction with most received power) and the AP may then apply sequential sweeping on that direction (or for the beam(s) for that direction).

There may be several different triggers/triggering methods that may cause the AP to transmit the downlink sounding burst(s) via sequential time-domain resources (e.g., via a plurality of sequential time slots), such as, for example: triggering (e.g., causing) the transmission of the downlink sounding burst in response to a random access (RACH) procedure, such as, in response to the AP receiving a random access (RACH) preamble from a UE or receiving a connection request (e.g., RRC/Radio Resource Control Connection Request, also known as msg 3 of a random access procedure); triggering or initiating the transmission of the downlink sounding burst in response to a handover procedure (e.g., in response to a handover notification or handover request from another AP/network node); and, triggering or initiating the transmission of the downlink sounding burst in response to a channel state information (CSI) procedure (e.g., in response to channel state feedback from the UE) where a user device may send a CSI report/CSI feedback to the AP reporting a state of a wireless channel. These are merely some example triggers/triggering methods that may trigger (cause) the transmission of the downlink sounding burst, and other triggers may be used to initiate or trigger an AP to transmit the downlink sounding burst(s). It may be up-to UE to decide whether there is a need for the downlink sounding burst(s). For example, in the case of digital UE architecture, there may be no need for a separate DL sounding burst(s). On the other hand, the UE with hybrid architecture may have received sufficient amount of reference signal to perform UE TX/RX beam training already. Finally, it may be up-to AP to make the decisions whether to transmit the DL sounding burst(s) or not, and when.

For example, in response to measuring signal quality or signal strength of cell specific reference signals (e.g., CSI-RS signals), a UE may send a CSI (channel state information) report to the AP indicating a rank indication (RI), a precoder matrix indication (PMI), that indicates a preferred precoder to use for downlink transmission, and a channel quality indication (CQI) that represents a modulation and coding scheme (MCS) that can be used for communication with the user device. The CSI report may be sent by the UE to the AP and may also indicate a handover from a source AP to a target AP, e.g., based on strength or quality of signals received from one or more APs.

Based on occurrence of one of a plurality of triggers/triggering methods, an AP/network node may schedule one or more or a plurality of sequential (e.g., sequential in time) resources to transmit a downlink burst of beam acquisition signals (downlink sounding bursts) to one or more user devices to allow the user devices to perform beamforming training. The AP/network node may then transmit the downlink sounding burst via a set (e.g., subset of N best AP beams for one or more user devices) of one or more beams in each of the plurality of sequential time-domain resources (e.g., sequential time slots). In an example implementation, a UE may notify the AP of a set (one or more) of the AP's transmit beam(s) that should be used to transmit multiple instances of the downlink sounding burst and a number of times/instances the downlink sounding burst should be transmitted on sequential time-domain resources. For example, the UE may indicate that TX beams 1 and 2 (e.g., out of 24 beams) from the AP are the best beams, and the user device may request a repetitive transmission of the downlink sounding burst on these AP transmit beams 1 and 2 for each of 4 time-domain resources (e.g., repeated transmission of downlink sounding burst for 4 sequential time slots/resources).

According to an example implementation, the transmission of the downlink sounding burst by the AP in (or during) each of the 4 sequential time-domain resources allows the UE to test/perform beamforming training with the AP's transmitted beam 1 and/or beam 2 with 4 different receive (RX) beams of the UE, in order to determine the best receive beam(s)/best antenna port(s) (e.g., the UE's beam(s) or antenna port(s) that produce a received signal having a best/greatest signal strength or signal quality). Thus, for example, the UE may apply a different receive beam when receiving the downlink sounding burst during each of the four sequential time-domain resources. The UE may then determine which of the four applied receive beams/antenna ports (e.g., where there may be one antenna port associated with each of a plurality of beams) provided the best signal strength/signal quality as measured by the user device. In an example implementation, a gap (in time) may be provided between each sequential time-domain resource (or only a part of each time domain resource may be used by the AP to transmit the downlink sounding burst) to provide time to allow the UE to switch receive beams for each of the sequential time-domain resources.

Selection of AP beam(s)/antenna port(s) used for the transmission of a downlink sounding burst from the AP to one or more UEs may be based on information of which downlink beam(s)/antenna port(s) would be most relevant for the UE, e.g., the downlink sounding burst may be transmitted by the AP via one or more (up-to N) best beam(s)/antenna port(s) based on received information (best AP beam information) from the UE(s). In addition, the downlink sounding burst may be multiplexed with downlink data symbols in a FDM (frequency division multiplex) manner. The downlink sounding burst may be triggered dynamically by the UE/user device.

In an example implementation, the transmission of the downlink sounding burst may be triggered as part of RACH (random access procedure/random access channel) signaling transmitted by a UE (e.g., RACH/random access preamble or RACH/random access message 3, also known as a radio resource control/RRC connection request message). In some cases, a triggering of (or a message used to trigger) the sounding burst transmission may indicate a number of transmission instances needed to perform beamforming training at the UE (e.g., indicating a number of sequential time-domain resources that should be scheduled and then used to transmit instances of the sounding burst).

According to an example implementation, the UE may decide (or make the decision or determination of) whether or not to trigger the transmission of the downlink sounding burst. For example, as noted above, a UE may transmit a message to the AP, such as: a random access preamble, a random access procedure message 3/msg3 (RRC connection request), a channel state feedback, wherein receipt by the AP of any of these messages may trigger the AP to transmit the downlink sounding burst to the UE. Triggering (or sending a message to trigger), of the downlink sounding burst by the UE, may also be based on perceived downlink signal quality and corresponding estimated required EIRP (effective isotropic radiated power) for the uplink transmission. For example, a UE located at or near a cell edge or in conditions where omni-directional antenna pattern cannot be used may trigger the downlink sounding burst, while a UE being close to the AP may not need to trigger the downlink burst (e.g., since if the UE is near the AP, received signal quality/strength at the UE may typically be sufficient without beamforming training). The triggering may be based also on the traffic conditions at the UE side, e.g., status of the UE's data buffer. The UE may also have up-to-date channel state information (e.g., indicating that channel state/channel quality is sufficient, and beamforming training is not necessary for the UE) and a separate downlink sounding burst may not be needed.

Also, a type of transceiver architecture used/provided by the UE/user device may determine whether or not the downlink sounding burst is required and/or may determine a number of times the sounding burst should be transmitted via sequential downlink resources. UEs based on or having a digital transceiver architecture may not require such a downlink sounding burst. Or, the downlink sounding burst may be transmitted via one downlink resource if the UE has a digital transceiver architecture. The AP may transmit the downlink sounding burst multiple times to the UE if the UE has/uses a hybrid transceiver architecture because beamforming training for multiple beams may be required for hybrid (including both analog and digital portions of the transceiver).

According to an example implementation, in a digital transceiver architecture, each transceiver unit (analog to digital conversion (A-D)+radio frequency (RF)+RF-to-baseband (BB) conversion, and digital to analog conversion (D-A)+Upmixing-to-RF) is connected to one antenna. Also, for example, in a digital architecture, the UE can calculate in baseband the TX beamforming weights based on received signals (all directions/beams) from BS at once (no need to sequentially try different RF beams but rather, the UE may process all possible directions at once) because in digital processing, all degrees of freedom/directions are available at one time. In a digital architecture, per antenna element measurement can be made which means that UE may measure received signals in all the directions from a single measurement.

On the other hand, in a hybrid architecture, there are multiple transceiver units (A-D+RF-to-BB-conversion/D-A+Upmixing-to-RF) where each transceiver unit is connected to multiple antennas that are connected together with a RF/analog beamforming network. RF beamforming involved in hybrid architecture means that per antenna information is not available at the UE receiver. When a UE would like to test different beams (directions) it requires that multiple measurement times are available and the UE measures CSI-RS with different beam patterns at a time.

According to an example implementation, a UE performing beamforming training for its RX and TX beams should be aware of the specific timing of the downlink sounding burst(s) so that that UE can receive the downlink sounding burst(s). In a first example implementation, there may be a fixed/predetermined timing relationship between a trigger (e.g. RACH/random access preamble) and the downlink sounding burst. According to one illustrative example, a first downlink sounding burst may be transmitted by an AP 4 subframes after receipt by the AP of a random access preamble. This is merely one example of a fixed timing relationship for the downlink sounding burst, and other fixed timing relationships may be used. According to another example implementation, where a selectable or variable timing relationship may be provided, the AP may schedule one or more resources for the transmission of the downlink sounding burst(s), and may notify the UE of the scheduled resource(s) for the downlink sounding burst. For example, a predetermined Downlink Control Information (DCI) may be used for indicating the timing relationship (among other parameters) for the transmitted downlink sounding burst(s).

In one embodiment, different trigger methods may be associated with different fixed timing relationships, e.g., a timing offset of 4 subcarriers may be associated with random access preamble acting as the trigger, whereas another number of subframes may be associated with the CSI/channel state feedback acting as the triggering method.

According to an example implementation, the transmitted downlink sounding burst may be the same signal (the same sounding burst) transmitted via multiple sequential/consecutive downlink resources. Also, a gap in time may be provided between consecutive resources, so that a UE can perform RF (radio frequency) switching to a different beam during the gap, e.g., so that the UE may apply a different receive beam to receive each instance of the downlink sounding burst, as part of beamforming training. The gap can be provided, e.g., such that there is one or more symbols, or at least a symbol fraction in between consecutive transmission instances of a downlink sounding burst. This gap may be implemented, e.g., by one or more Zero-Tail DFT-S-OFDMA symbols. Another option would be to use OFDMA symbols with zero-CP (switching is performed during CP/cyclic prefix).

Figure 3:
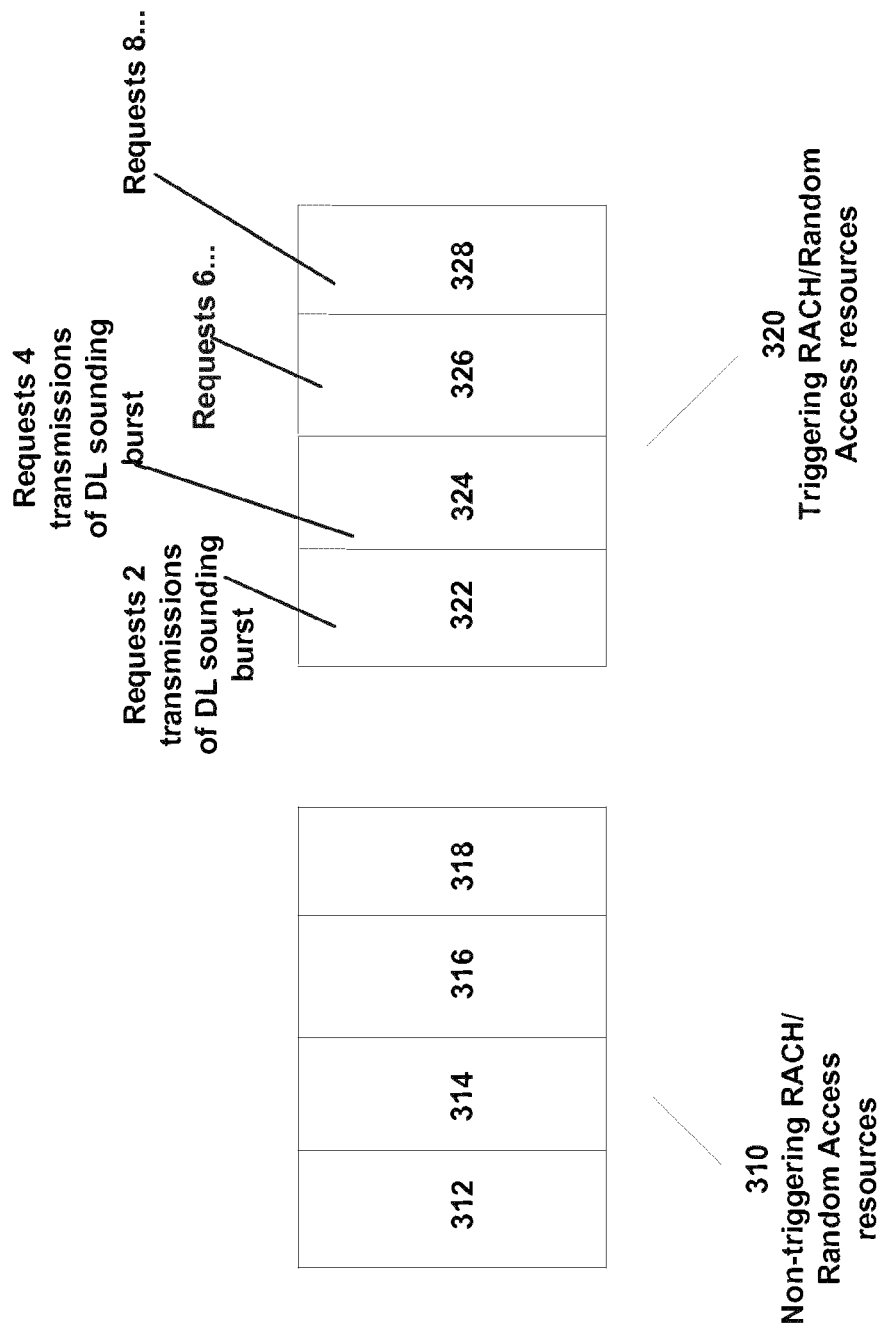
FIG. 3 is a diagram illustrating random access resources according to an example implementation.

FIG. 3 is a diagram illustrating random access resources according to an example implementation. One or more of the random access resources shown in FIG. 3 may be used by a UE to transmit a random access preamble to an AP. According to an example implementation, the random access resources may include a pool of non-triggering random access resources 310 (e.g., including resources 312, 314, 316 and 318) or a pool of triggering random access resources 320 (e.g., including resources 322, 324, 326 and 328).

According to an example implementation, a random access preamble transmitted by a UE to an AP via one of the non-triggering resources 310 will not trigger (e.g., does not cause or request) a transmission of a downlink sounding burst from the AP. On the other hand, a random access preamble transmitted by a UE to an AP via one of the triggering random access resources 320 triggers (or requests or causes) a transmission from the AP of the downlink sounding burst(s).

Furthermore, selection and use of a particular triggering resource (e.g., use of a particular one of triggering resources 322, 324, 326, 328) may indicate or communicate a request by the UE to the AP to transmit a particular number of instances/repetitions of the downlink sounding burst to the UE. For example, a UE transmitting a random access preamble to an AP via triggering resource 322 indicates a request by the UE to the AP to transmit 2 instances (e.g., via 2 sequential time-domain resources) of the downlink sounding burst to the UE. Similarly, as shown in FIG. 3, triggering resources 324, 326 and 328 may be used by UE to transmit a random access preamble to an AP to request the\ AP to transmit 4, 6 or 8, respectively, instances of the downlink sounding burst. The numbers 2, 4, 6 and 8 for triggering resources 322, 324, 326 and 328, respectively, are merely illustrative examples, and other numbers of instances/repetitions of the transmission of the downlink sounding burst may be used.

In addition, a different triggering resource (e.g., 322, 324, 326, 328) may be used by a UE to transmit a random access preamble to indicate a different AP beam should be used for the transmission of the downlink sounding burst. For example, a UE may: transmit a random access preamble via resource 322 to indicate that AP beam 1 should be used by the AP to transmit the downlink sounding burst, transmit a random access preamble via resource 324 to indicate that AP beam 2 should be used by the AP to transmit the downlink sounding burst, transmit a random access preamble via resource 326 to indicate that AP beam 3 should be used by the AP to transmit the downlink sounding burst, or may transmit a random access preamble via resource 328 to indicate AP beam 4 should be used by the AP to transmit the downlink sounding burst.

Figure 4:
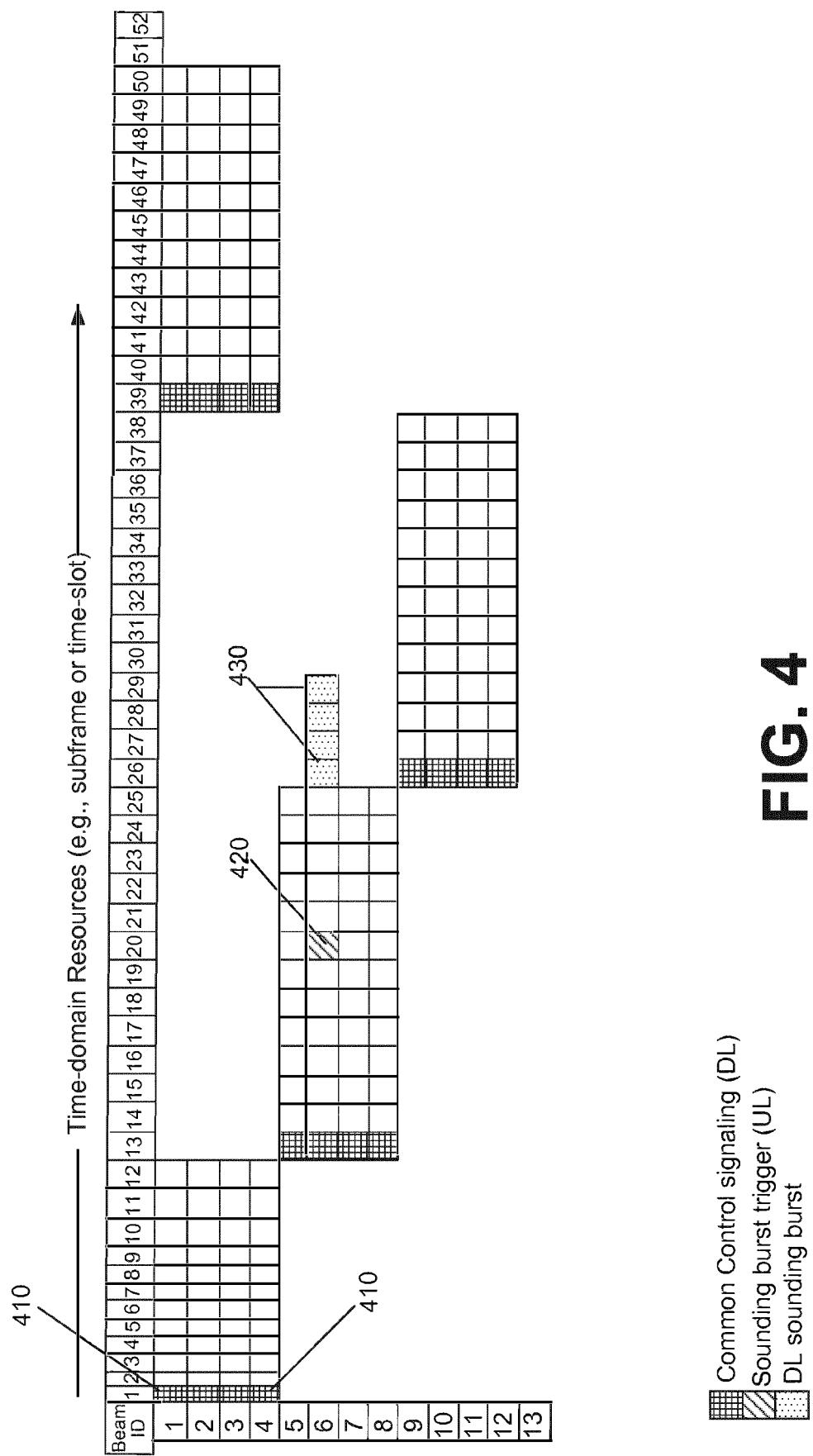
FIG. 4 is a diagram illustrating a transmission of common control signaling and a downlink sounding burst according to an example implementation.

FIG. 4 is a diagram illustrating a transmission of common control signaling and a downlink sounding burst according to an example implementation. As shown in FIG. 4, the vertical (or Y) axis corresponds to different beams/beam IDs, from beam 1 to beam 13, in this example. The horizontal (or X) axis identifies time or time-domain resources, such as subframe or time-slot. Initially, at 410, during time-domain resource 1, the AP transmits common control signaling via beams 1-4. Similarly, during time-domain resources 13 and 26, the AP transmits common control signals via beams/beam IDs 5-8 and 9-12, respectively. As a periodic process (the periodic transmission of common control signaling via one or more beams), the transmission of common control signaling via beams 1-4 repeats again during time-domain resource 39, as shown in FIG. 4.

According to this illustrative example, the UE may measure received channel state reference signals received via the common control signaling received via each of a plurality of beams, and may determine, for example, that AP beam 6 (as an illustrative example) is the best/strongest beam for the UE. The UE may determine or identify 4 receive beams as the UE's best receive beams, and the UE may want to perform beamforming training for these 4 receive beams against a signal received from the AP via the AP transmit beam 6 (the AP's best transmit beam with respect to the UE).

Therefore, according to an example implementation, at 420, the UE transmits a trigger (e.g., a random access preamble, a random access message 3/RRC connection request, a handover message/request, a channel state information feedback, or other trigger or message to request or cause a transmission of downlink sounding burst(s)) to the AP during resource 20, which may indicate or identify AP beam 6 for the downlink sounding burst, and may also indicate that 4 instances of the downlink sounding burst should be transmitted by the AP. For example, the UE may use a specific random access triggering resource to indicate the AP beam 6 should be used for the downlink sounding burst and/or use a specific random access resource to indicate 4 instances of the downlink sounding burst. Alternatively, the AP may indicate, within one or more fields of a trigger/message sent by the UE to the AP, the AP beam 6 and indicate the 4 instances of the downlink sounding burst be transmitted to the UE.

At 430, in accordance with the trigger/sounding burst request received by the AP from the UE, the AP transmits the downlink sounding burst via beam 6 for each of the requested number of (sequential) time-domain resources (4 sequential time-domain resources in this illustrative example), e.g., during time-domain resources 26-29, as shown in FIG. 4. According to an example implementation, in the case of the random access preamble triggering the downlink sounding bursts, the timing (or delay) of the transmission of the first downlink sounding burst at resource 26 may occur a fixed number of resources (e.g., 6 resources in this example) after the transmission of the random access preamble (at resource 20). If a message (e.g., random access msg3, channel state feedback, or other message) is transmitted by the UE to trigger the downlink sounding burst, then this timing (or location) of the sounding burst(s) may be indicated in such message. In one example embodiment, the UE may first wait for all the common control signaling received via all beams 1-12 before deciding which of the beams is best/are best for this particular UE, e.g., based on signal strength or signal quality of received signals.

A time gap may be provided between each resource used to transmit the sounding burst, e.g., to allow the UE to switch beams for each resource. Thus, the UE may receive the downlink sounding burst via AP beam 6 during each of the 4 time-domain resources (resources 26, 27, 28 and 29 in FIG. 4), and may apply a different receive beam for each of the 4 resources in order to determine which of the 4 UE receive beams is the best for receiving signals from the AP. This may be referred to as beamforming training. In an example implementation, due to the reciprocal nature of the wireless channels, the UE may determine a best transmit beam(s) for transmitting signals to the AP based on the best UE receive beam(s). In this manner, the UE may perform beamforming training to select a receive beam and a transmit beam based on receiving a downlink sounding burst via one or more AP transmit beams for one or more sequential time-domain resources.

Figure 5:
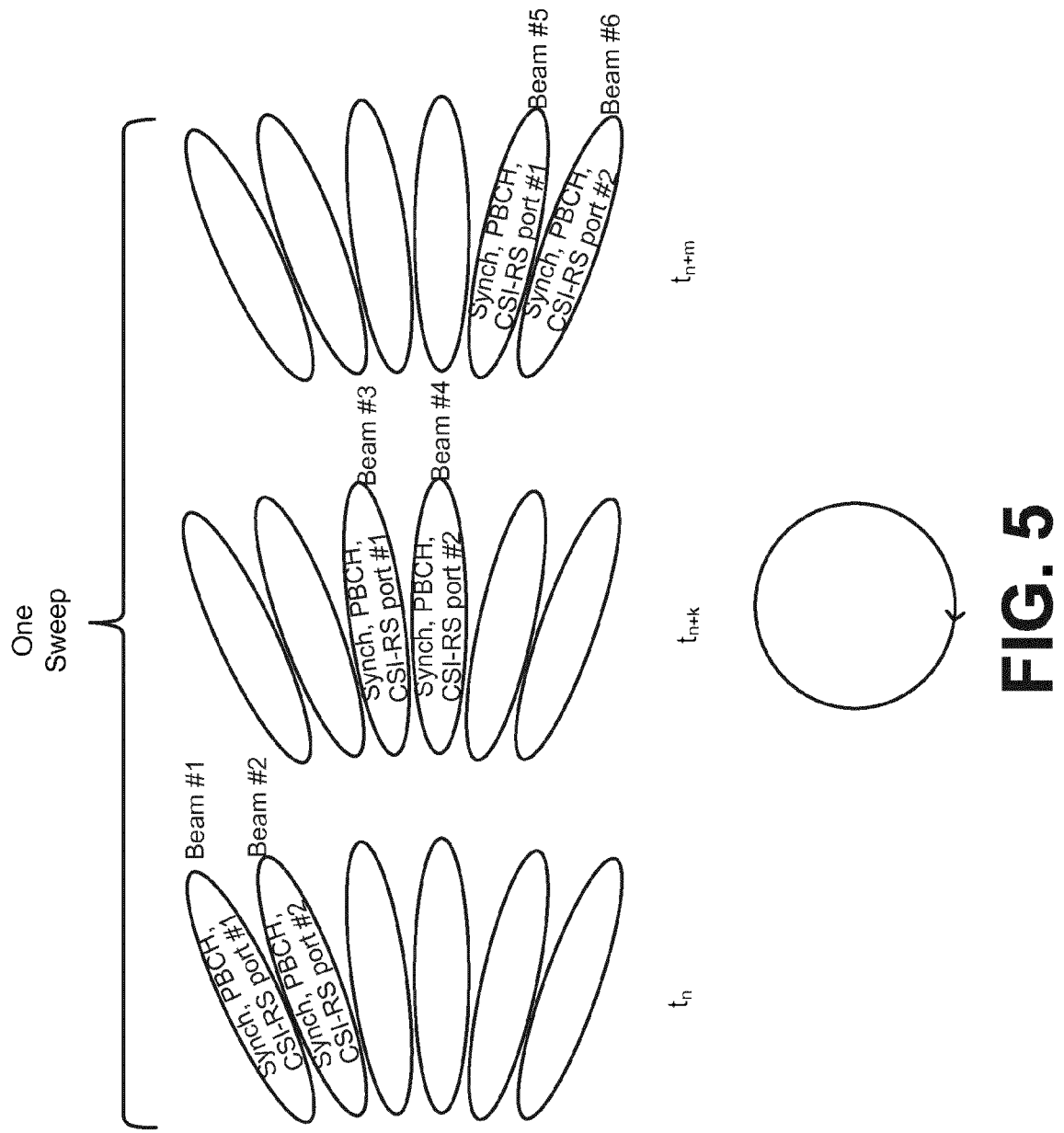
FIG. 5 is a diagram illustrating a transmission of common control signaling to one or more UEs via a plurality of beams according to a predetermined beam sweeping pattern according to an example implementation.

FIG. 5 is a diagram illustrating a transmission of common control signaling to one or more UEs via a plurality of beams according to a predetermined beam sweeping pattern according to an example implementation. In this simple illustrative example shown in FIG. 5, the AP may be able to transmit 6 different beams, and may have 2 antenna ports. Based on the 2 antenna ports, the AP has the ability to transmit 2 beams at a time. Thus, with the periodic transmission of the common control signaling, the AP may transmit the common control signaling (e.g., which may include synchronization signals, PBCH signals, CSI-RS signals, and/or a beam ID/beam identification) via beam 1 and beam 2 during time-domain resource tn. Similarly, the AP may transmit the common control signaling for beam 3 and beam 4 during time-domain resource tn+k, and may transmit common control signaling for beam 5 and beam 6 during time-domain resource tn+k. Therefore, the beam sweeping pattern is that beams 1 and 2 are transmitted, followed by beams 3 and 4, followed by beams 5 and 6. This process may then repeat, with transmission of common control signaling to multiple/all UEs for beam 1 and beam 2.

The number used in the illustrative example shown in FIG. 5, e.g., 6 total AP transmit beams and 2 antenna ports, and the example beam sweeping pattern, are merely illustrative examples, and other numbers, and other beam sweeping patterns may be used. For example, there may be 48 different beams, and the AP may have 8 antenna ports (allowing the AP to transmit 8 different beams at a time/simultaneously. Thus, in such a case, a periodic beam sweeping pattern may be used to transmit common control signaling may be used that transmits the common control signaling for all 48 beams during 6 sequential (or successive) time-domain resources as follows: beams 1-8, beams 9-16, beams 17-24, beams 25-32, beams 33-40, and beams 41-48 (and then repeat). This is merely another example and is provided for illustration, and other examples may be used. Any number of total beams and antenna ports may be used.

As noted above, a selection of a RACH/random access resource may indicate a request for a downlink sounding burst. The cell may have multiple RACH/random access resources, which are divided into multiple resource pools, such as a pool of non-triggering resources 310 and a pool of triggering resources 320 (see FIG. 3). For example, transmission of a random access preamble via a resource in certain resource pool(s), e.g., via a resource within non triggering resources 310, does not trigger a transmission of the downlink sounding burst from the AP to the UE, whereas a transmission of a random access preamble via a resource in other resource pool(s), e.g., via triggering resources 320, trigger (or cause) the downlink sounding burst to be transmitted from the AP to the UE.

According to an example implementation, resources that trigger the downlink sounding burst may be further associated with downlink (AP transmit) beams (one-to-one mapping between a RACH/random access resource and a downlink beam, or a one-to-many mapping between a RACH/random access resource and a set of downlink beams). According to an example implementation, a selection of certain RACH/random access resources (e.g., selection of any of the resources 322, 324, 326, 328 within triggering resources 320) may trigger correspondingly a transmission of a downlink sounding burst from the AP to the UE. A selected RACH/random access resource used to transmit a random access preamble may also indicate to the AP a set of AP transmit (downlink) beam(s) to be used by the AP to transmit the downlink sounding burst to the UE. According to an example implementation, information may be received from the UE (e.g., implicitly as part of RACH/random access preamble & related timing information), which may indicate a set of beams. More detailed information related to the best beam may be determined based on UL signal measurement (by AP), such as RACH/random access preamble measurement, for example.

According to an example implementation, when a UE transmits a random access preamble via a RACH/random access resource, the AP may respond with a downlink control information (DCI) providing positive (or negative) response for the preamble and scheduling information (e.g., indicating the sequential time-domain resources when the sounding burst will be transmitted) for the downlink sounding burst for TX beam training. An uplink grant for the first UE message containing data (such as RACH Msg3/RRC connection request) may be signaled as well in the same downlink control information (DCI) to the UE. Scheduling information for the downlink sounding burst may be explicitly indicated in the DCI or derived implicitly from DCI (with predetermined rules).

Alternatively, there can be specific information elements (or fields) included in the RACH msg3/RRC connection request for triggering downlink sounding burst. By triggering a transmission of a downlink sounding burst via a RACH msg3/RRC connection request from a UE, this would allow more bits to provide more information to the AP regarding the requested sounding burst, such as identifying one or more AP transmit beams for the burst, a number of instances (or a number of resources, or a number of receive beams the UE would like to test) that the sounding burst should be repeated via sequential time-domain resources, etc. Alternatively (or additionally), a trigger may be incorporated into a Channel State Information (CSI) acquisition procedure, e.g., wherein a UE may include a sounding burst trigger (e.g., indicating a request for sounding burst, identifying one or more AP TX beams, a number of instances to transmit the sounding burst) within a channel state information (CSI) feedback/report sent to the AP. A UE may explicitly indicate in the CSI report the need for beam re-adjustment procedure, which may cause the AP to transmit the downlink sounding burst(s).

In addition, according to another example implementation, an AP/network node may trigger a transmission of a downlink sounding burst to a UE based on a decrease in an uplink channel quality, for example. Also, according to an example implementation, an AP may trigger (or initiate) a transmission of downlink sounding burst based on load balancing among its downlink beams that are linked to hardware resources (transceiver units or antenna ports), e.g., based on a need to offload some traffic from a first beam/antenna port/transceiver to another beam/antenna port/transceiver, for example. Or, the AP may need to re-adjust certain downlink beams (that also correspond to uplink RX beams at the UE). Therefore, the AP may trigger beamforming training based on adjusted downlink AP beams. In addition, a handover of a UE from a source BS to a target BS may trigger a transmission of the downlink sounding burst. According to an example implementation, information of target cell's best/strongest beams from UE point of view may be signaled to target cell. The target cell may then schedule resources for transmission of a downlink sounding burst for TX beam training when the cell change occurs for the UE. Also, the target cell may also schedule uplink resources for the UE, e.g. for the PRACH preamble and for timing acquisition in the new cell.

According to an example implementation, the AP transmits periodically essential common control signaling in beam domain (cell specific beams) that allow UEs to detect a cell and corresponding cell specific beams. For example, the AP may transmit synchronization signal(s) and beam specific reference signal from each cell specific beam. During one sweep, the AP covers the whole sector aperture with the beams. Depending on applied beam widths in azimuth and elevation domain the number of beams may range from some tens up to hundred beams.

A hybrid UE relying on strong RF beamforming may have different strategies when doing initial cell search and subsequent initial access. A UE may start with omnidirectional RX beam pattern to perform cell search and cell selection resulting in lower complexity compared to where a UE starts with narrow beams from the beginning (this illustrative example may assume that the cells are dimensioned so that omnidirectional RX beam at the UE can be used from downlink link budget point of view).

When performing cell detection and selection based on periodical beam based discovery signal transmissions from an AP, a UE may be able to find out the best or most relevant beams for itself. Typically, the number of strong AP (downlink) beams would be at maximum around 8 while the total number of downlink beams may be 32, 64, 96 or other number. Also, for UE TX beamforming training UE shall basically test all the RX beam options against each downlink beam option. Thus, the complexity in UE TX beamforming training can be largely reduced when the BS transmit burst for the training only from the relevant downlink beams, and not from all the beams which would be the case if UE would start using narrow beams. To alleviate that, the UE may first find relevant downlink beams (e.g., which may be 2-8 AP beams, for example) using omnidirectional RX pattern beam for which the UE would then request separate downlink sounding burst to train its RX/TX beams. As noted above, these events may be incorporated into a RACH procedure, active data transmission procedure and/or a handover procedure.

Figure 6:
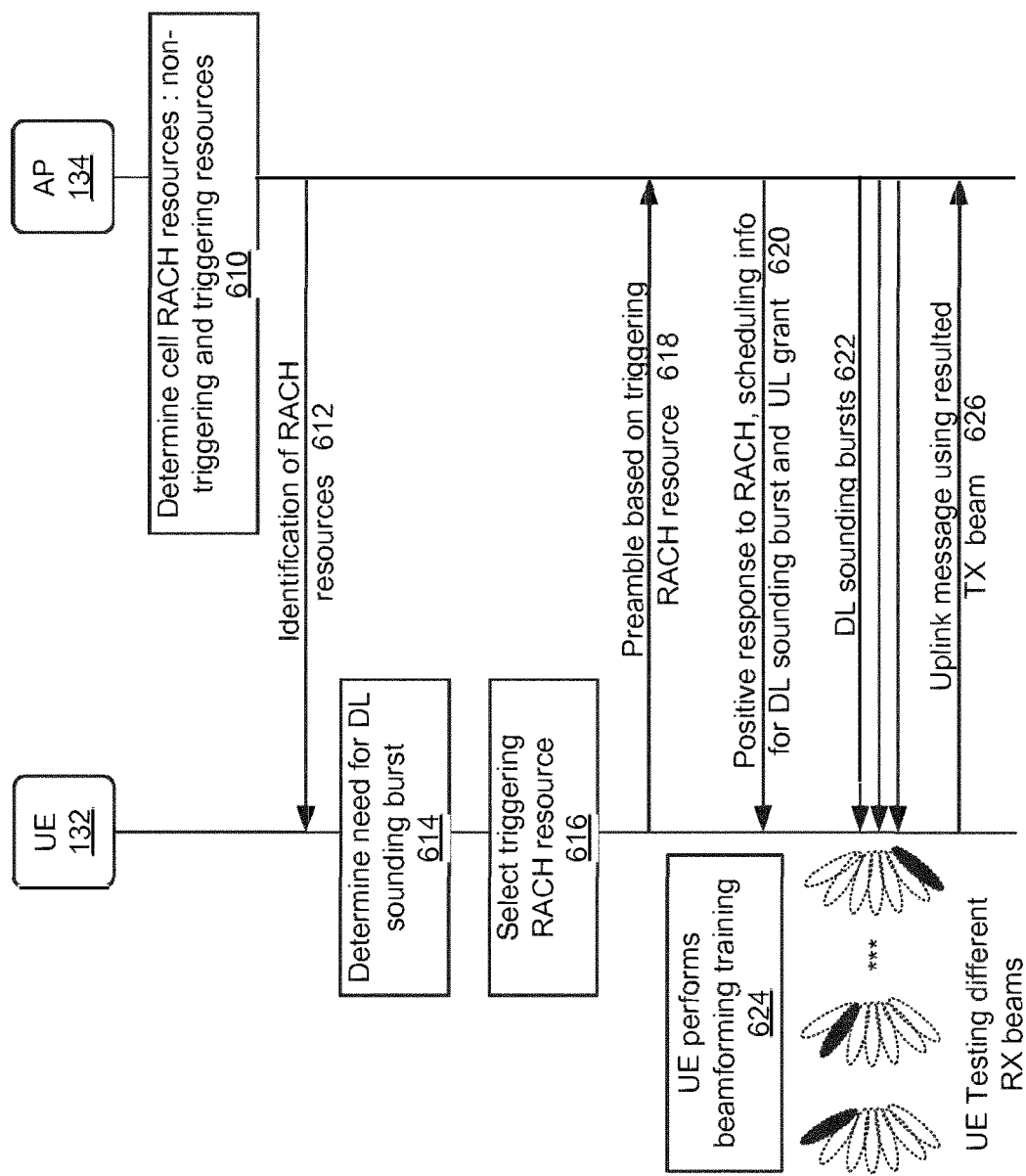
FIG. 6 is a diagram illustrating initial access to a cell according to an example implementation.

FIG. 6 is a diagram illustrating initial access to a cell according to an example implementation. A UE 132 and an APBS are shown in FIG. 6. At 610, the AP 134 determines non-triggering resources 310, and triggering resources 320 that may be used by UEs to transmit random access preamble. At 612, the AP 134 signals (or sends a message identifying) the random access resources, including the non-triggering resources 310 and the triggering resources 320, for example. At 614, the UE 132 determines a need for beamforming training, e.g., a need to receive a downlink sounding burst(s) from the AP 134 so that the UE 132 can perform beamforming training with respect to AP 134. At 616, UE 132 selects a resource (e.g., resource 326, FIG. 3) of the triggering resources 320. At 618, the UE 132 sends/transmits a random access/RACH preamble to the AP 134 via the selected triggering resource 326, for example. For example, a triggering resource may be used to transmit the preamble that identifies a downlink/AP beam(s) for the sounding burst and/or a number of resources or a number of occurrences for transmission of the sounding burst.

At 620, the AP 134 sends a positive response to the UE 132, including scheduling information that identifies the resources (e.g., sequential time-domain resources) for transmission, via a set of one or beams, of an aperiodic (e.g., transmitted on demand/request) downlink sounding burst. At 622, the AP 134 transmits, via a set of one or more AP transmit beams in each of the plurality of time-domain resources, an aperiodic downlink sounding burst to the UE 132 to allow the UE to perform beamforming training. At 622, the UE performs beamforming training based on the received occurrences of the downlink sounding burst, e.g., including applying a different receive beam to receive the sounding burst for each of the time-domain resources. The UE 132 may determine, e.g., based on signal strength or signal quality of the received sounding burst for each receive beam, which UE receive beam(s) is the best or strongest receive beam(s) for receiving signals from the AP 134. UE 132 may also determine a best transmit beam(s) for transmitting to the AP 134, e.g., based on the best receive beam and the reciprocal nature of the uplink and downlink wireless channels between the UE and AP. At 626, the UE 132 may send an uplink message to the AP 134 using the identified best transmit beam.

According to an example implementation, a burst signal may be used that may use a waveform that has a built-in guard period for the beam switching purposes (to allow the UE to switch beams between each received sounding burst. One example is to use a zero-tail-DFT-spread-OFDM waveform/symbol(s) to transmit the downlink sounding burst. Another option is to apply zero-CP OFDM symbol(s). These options allow RF beam switching within each symbol. This means that beam switching can be fast. In the case of normal OFDMA, there, for example, may typically need to be a specific gap (such as a guard period) provided to allow for RF beam switching.

Figure 7:
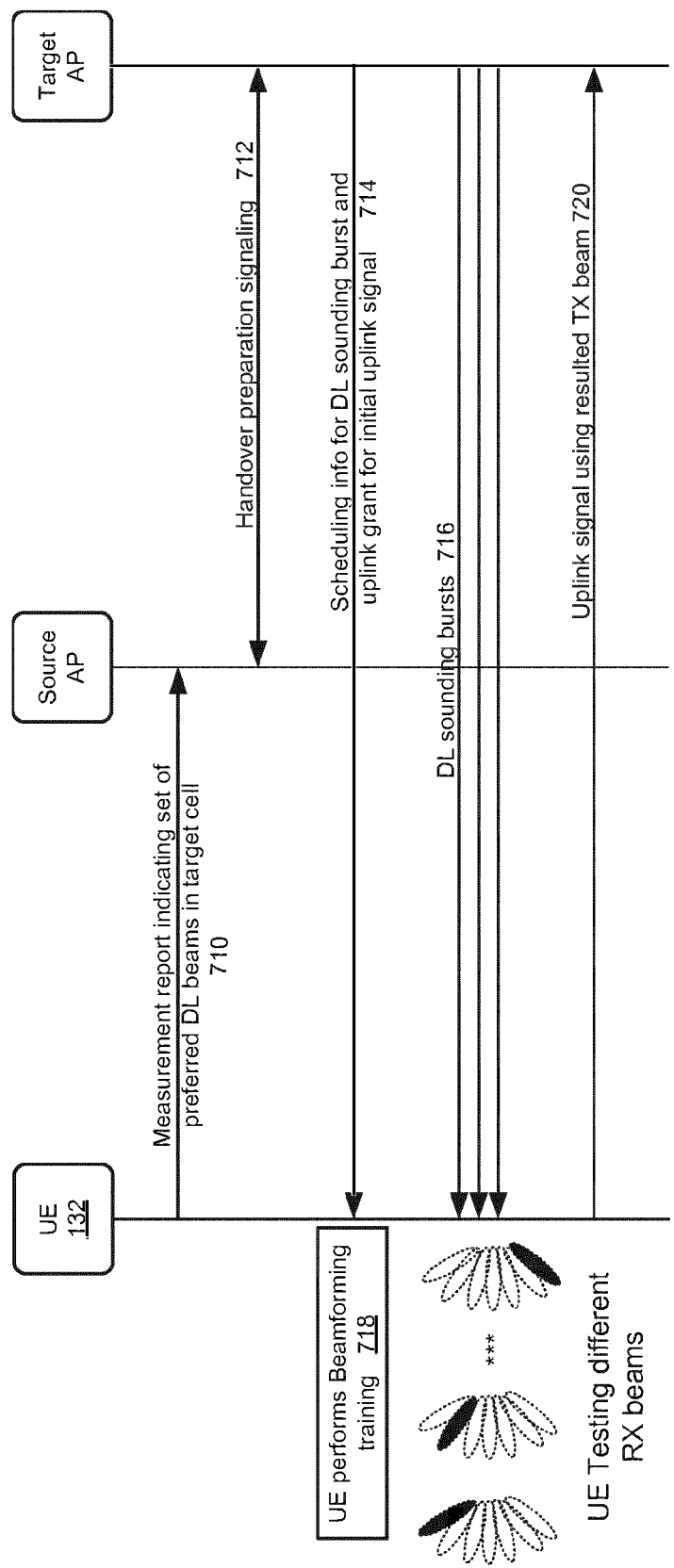
FIG. 7 is a diagram illustrating a transmission of a downlink sounding burst as part of a handover procedure.

FIG. 7 is a diagram illustrating a transmission of a downlink sounding burst as part of a handover procedure. At UE 132 is shown, along with a source APBS and a target APBS. At 710, the UE 132 sends a measurement report (e.g., identifying a signal strength of a target BS that indicates a handover should be performed from source AP to target AP) to the source AP. The measurement report may include a set of preferred downlink/AP beams of the target AP, and/or a number of occurrences that the sounding burst should be transmitted from the target AP. At 712, handover preparation 712 is performed or exchanged between the source AP and the target AP. As part of the handover preparation 712, source AP may signal to target AP: 1) a request to perform a handover for the UE 132 to target AP; and 2) the set of preferred downlink/AP beams of the target AP that the UE 132 has identified for a sounding burst; and/or 3) the number of occurrences requested for transmission of the downlink sounding burst via the preferred set of downlink beams.

At 714, the target AP (AP of target cell) sends to the UE 132 the scheduling information that identifies the sequential resources for transmission of the downlink sounding burst from target AP and an uplink grant for an initial uplink transmission from the UE to the target AP. This communication of scheduling information may typically occur via the source cell. For example, the target AP may send to the UE, via the current source AP (AP of the source cell), the scheduling information that identifies the sequential resources for transmission of the downlink sounding burst and the uplink grant. At 716, the target AP may send/transmit, via the set of the preferred downlink beam(s) in each of the plurality of identifies sequential resources, an aperiodic downlink sounding burst. At 718, the UE 132 performs beamforming training, e.g., by applying a different UE receive beam to receive each of the downlink sounding bursts, and then determines which receive beam is the best for communicating with the target AP based on strength and/or quality of the received sounding bursts. The UE 132 then also determines a best transmit beam (e.g., based on the best receive beam and the reciprocal nature of the uplink and downlink wireless channels) for transmitting to the target AP. At 720, the UE 132 sends an uplink signal/message to the target AP via the best UE transmit beam for the target AP. The target cell may also schedule uplink resources for the UE in sequent after downlink burst e.g. for the PRACH preamble and TA acquisition purpose in the new cell.

Figure 8:
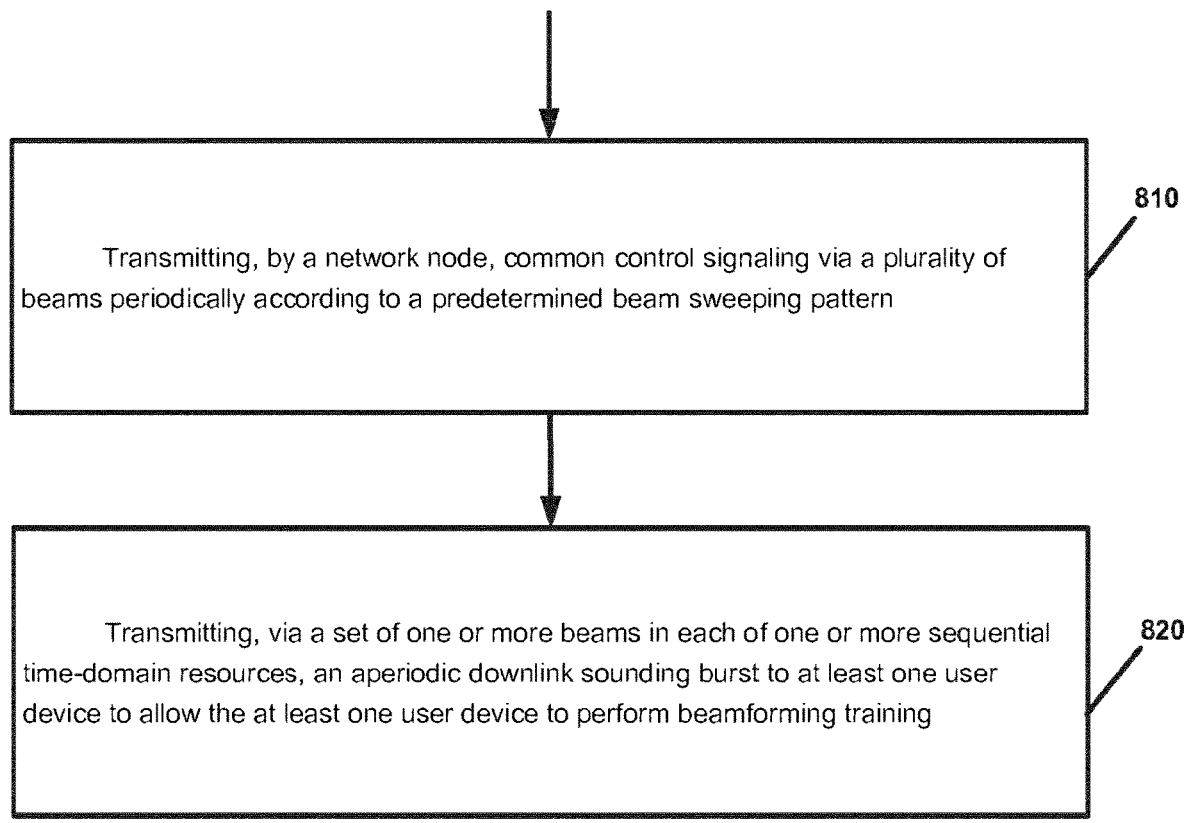
FIG. 8 is a flow chart illustrating operation of a network node according to an example implementation.

FIG. 8 is a flow chart illustrating operation of a network node according to an example implementation. FIG. 8 may be directed to beamforming training. Operation 810 includes transmitting, by a network node, common control signaling via a plurality of beams periodically according to a predetermined beam sweeping pattern. And, operation 820 includes transmitting, via a set of one or more beams in each of one or more sequential time-domain resources, an aperiodic downlink sounding burst to at least one user device to allow the at least one user device to perform beamforming training.

According to an example implementation of the method of FIG. 8, the transmitting an aperiodic downlink sounding burst may include: transmitting, via a set of one or more beams in each of a plurality of sequential time-domain resources, an aperiodic downlink sounding burst to at least one user device to allow the at least one user device to perform beamforming training.

According to an example implementation of the method of FIG. 8, a number of the one or more sequential time-domain resources for the transmission of the downlink sounding burst is based on a number of transmit beams or receive beams of the at least one user device. This relates to the angular resolution that can be achieved by the DL sounding burst, i.e., how many different beam realizations can be covered.

According to an example implementation of the method of FIG. 8, a number of the plurality of sequential time-domain resources for the transmission of the downlink sounding burst is based on a number of antenna elements of the at least one user device. For example, the number of antenna elements may correspond with the angular resolution achievable (and needed). Thus, for example, a greater number of antenna elements may allow more beams and/or a finer resolution of beams.

According to an example implementation of the method of FIG. 8, a switching gap is provided between each of the one or more sequential time-domain resources to allow the user device to switch to a different receive beam for each of the sequential time-domain resources.

According to an example implementation of the method of FIG. 8, wherein the number of sequential resources is greater than 1 when the at least one UE applies a hybrid transceiver architecture.

According to an example implementation of the method of FIG. 8, wherein the number of sequential resources is equal to 1 when the at least one UE applies a digital transceiver architecture.

According to an example implementation of the method of FIG. 8, wherein the transmitting, via a set of one or more beams in each of one or more sequential time-domain resources, the aperiodic downlink sounding burst is triggered based on one of a plurality of triggering methods; and wherein a number of the one or more sequential time-domain resources for the transmission of the downlink sounding burst is based on the one of the plurality of triggering methods.

According to an example implementation of the method of FIG. 8, wherein the set of one or more beams used to transmit the aperiodic downlink sounding burst is derived based on at least one of a user device triggering that triggers the transmitting the downlink sounding burst and an uplink channel measurement by the network node.

According to an example implementation of the method of FIG. 8, wherein the transmitting, via a set of one or more beams in each of one or more sequential time-domain resources, the aperiodic downlink sounding burst is triggered based on an occurrence of one of a plurality of triggering methods that include a first category of triggering methods and a second category of triggering methods; wherein a number of the one or more sequential time-domain resources for the transmission of the downlink sounding burst is fixed for the first category of triggering methods, and is adjustable by the network node for the second category of triggering methods.

According to an example implementation of the method of FIG. 8, wherein the first category of triggering methods includes triggering the transmitting of the aperiodic downlink sounding burst in response to a random access preamble of a random access procedure; and wherein the second category of triggering methods comprises triggering or initiating the transmitting the aperiodic downlink sounding burst in response to receiving at least one of the following: a handover message, a channel state information feedback, and a subsequent message of the random access procedure.

According to an example implementation of the method of FIG. 8, the method further including transmitting scheduling information indicating the one or more sequential time-domain resources for the transmission of the aperiodic downlink sounding burst to the user device upon detecting an occurrence of the second category of triggering methods; and causing a transmission of the aperiodic downlink sounding burst to the user device according to the determined scheduling information.

According to an example implementation of the method of FIG. 8, the method further including transmitting a list of a plurality of random access resources that includes a non-triggering resource that is not associated with triggering the transmission of the aperiodic downlink sounding burst, and a triggering resource that is associated with triggering the transmission of the aperiodic downlink sounding burst; and, receiving, by the network node via the triggering resource, a random access preamble; wherein the transmitting the aperiodic downlink sounding burst is triggered by the network node in response to receiving the random access preamble via the triggering resource.

According to an example implementation of the method of FIG. 8, the method further includes: determining scheduling information indicating one or more sequential time-domain resources for the transmission of the aperiodic downlink sounding burst to the user device; transmitting the scheduling information to a network node of a source cell of a handover process; and causing a transmission of the aperiodic downlink sounding burst to the user device according to the determined scheduling information after a handover has been performed for the user device.

According to an example implementation of the method of FIG. 8, wherein the network node comprises a network node of a source cell, the method further including: receiving, by the network node of the source cell, a handover message indicating a handover of the user device to the network node; receiving, by the network node of the source cell from a network node of a target cell of the handover, scheduling information indicating one or more resources of the target cell of the handover for transmission of the downlink sounding burst; and sending, by the network node of the source cell to the user device, the scheduling information for the transmission of the aperiodic downlink sounding burst by the network node of the target cell.

According to an example implementation of the method of FIG. 8, wherein the transmitting the aperiodic downlink sounding burst is initiated or triggered based on an occurrence of one of a plurality of triggering methods; wherein there is a timing relationship between an occurrence of the triggering method and the transmission of the downlink sounding burst.

According to an example implementation of the method of FIG. 8, wherein the timing relationship is fixed for a first category of triggering methods; and wherein the timing relationship is adjustable by the network node for a second category of triggering methods.

According to an example implementation of the method of FIG. 8, the method further including selecting, by the network node, a group of N best beams or antenna ports for the at least one user device based on information received from the at least one user device; and determining, based on the group of N best beams or antenna ports, the set of one or more beams for transmitting, via the one or more sequential time-domain resources, the aperiodic downlink sounding burst.

According to an example implementation, an apparatus includes at least one processor and at least one memory including computer instructions, when executed by the at least one processor, cause the apparatus to: transmit, by a network node, common control signaling via a plurality of beams periodically according to a predetermined beam sweeping pattern; and transmit, via a set of one or more beams in each of one or more sequential time-domain resources, an aperiodic downlink sounding burst to at least one user device to allow the at least one user device to perform beamforming training.

According to an example implementation, an apparatus includes: means (e.g., 1002A/1002B and/or 1004, FIG. 10) for transmitting, by a network node, common control signaling via a plurality of beams periodically according to a predetermined beam sweeping pattern; and means (e.g., 1002A/1002B and/or 1004, FIG. 10) for transmitting, via a set of one or more beams in each of one or more sequential time-domain resources, an aperiodic downlink sounding burst to at least one user device to allow the at least one user device to perform beamforming training.

Figure 9:
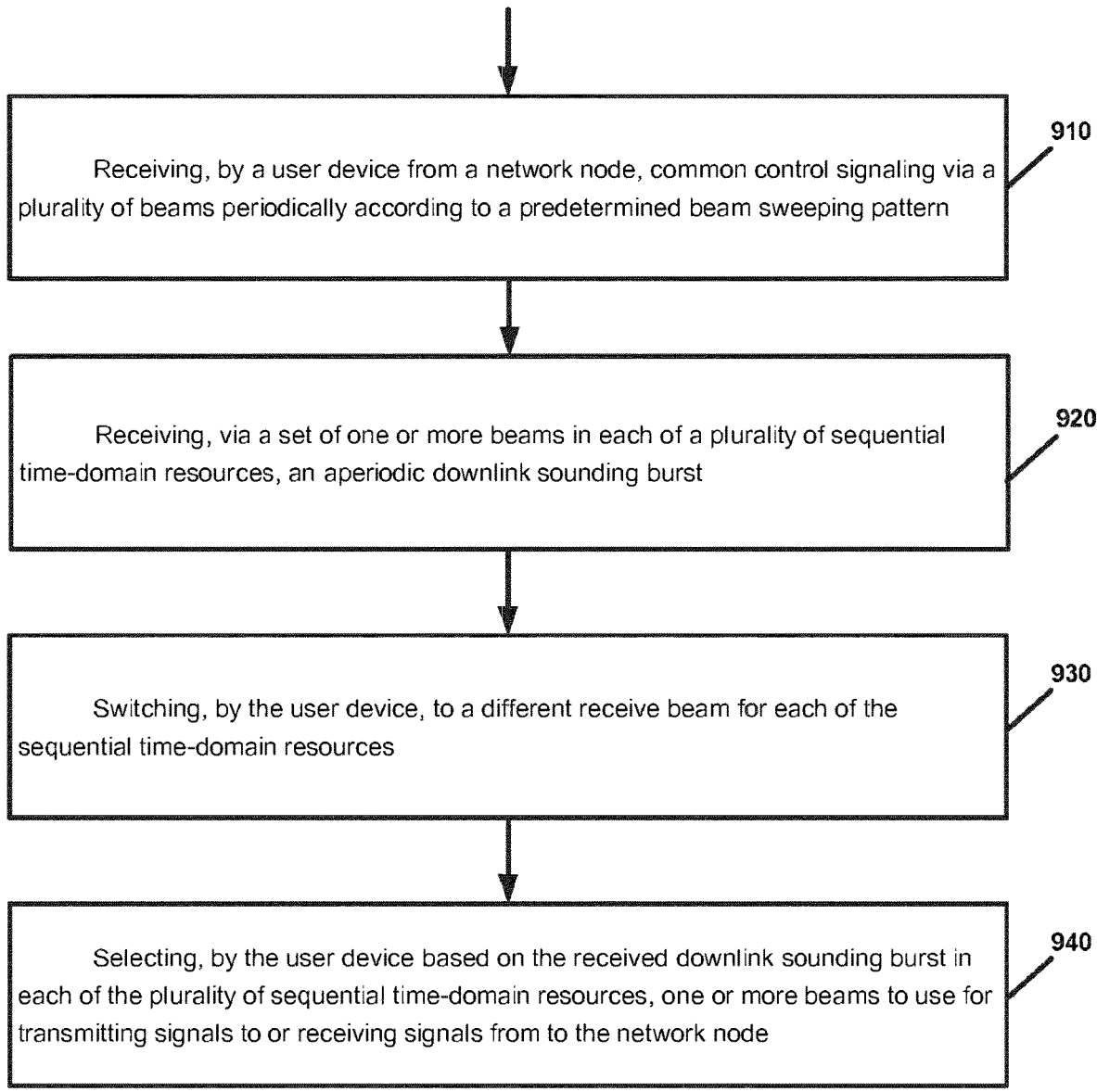
FIG. 9 is a flow chart illustrating operation of a user device/UE according to an example implementation.

FIG. 9 is a flow chart illustrating operation of a user device/UE according to an example implementation. The method of FIG. 9 may be directed to a method of beamforming training. Operation 910 includes receiving, by a user device from a network node, common control signaling via a plurality of beams periodically according to a predetermined beam sweeping pattern. Operation 920 includes receiving, via a set of one or more beams in each of a plurality of sequential time-domain resources, an aperiodic downlink sounding burst. Operation 930 includes switching, by the user device, to a different receive beam for each of the sequential time-domain resources. And, operation 940 includes selecting, by the user device based on the received downlink sounding burst in each of the plurality of sequential time-domain resources, one or more beams to use for transmitting signals to or receiving signals from to the network node.

According to an example implementation of the method of FIG. 9, a switching gap is provided between each of the plurality of sequential time-domain resources to allow the user device to switch to a different receive beam for each of the sequential time-domain resources.

According to an example implementation of the method of FIG. 9, the method may further include receiving a list of a plurality of random access resources that includes a non-triggering resource that is not associated with triggering the transmission of the aperiodic downlink sounding burst, and a triggering resource that is associated with triggering the transmission of the aperiodic downlink sounding burst; transmitting, by the user device to the network node via the triggering resource, a random access preamble; wherein the receiving the aperiodic downlink sounding burst comprises receiving, via a set of one or more beams in each of a plurality of sequential time-domain resources, the aperiodic downlink sounding burst based on the transmission of the random access preamble via the triggering resource.

According to an example implementation of the method of FIG. 9, the method further including determining, by the user device, a group of N best beams or antenna ports of the network node based on the reception of the common control signaling; and transmitting an indication of the group of N best beams or antenna ports to the network node.

According to an example implementation of the method of FIG. 9, the method further including transmitting, by the user device, an indication to the network node in order to instruct the network node to trigger a transmission of the aperiodic downlink sounding burst to the user device, wherein the indication is one of the following: a transmission of a random access preamble, a transmission of a further message in a random access procedure, a transmission of a channel state information feedback, and a transmission of a handover request.

According to an example implementation of the method of FIG. 9, wherein there is a predetermined timing relationship between the transmitting of the indication and the receiving of the aperiodic downlink sounding burst.

According to an example implementation of the method of FIG. 9, the method further including receiving scheduling information from the network node after transmitting the indication, wherein the scheduling information indicates downlink resources for the reception, by the user device, of the aperiodic downlink sounding burst.

According to an example implementation, an apparatus includes at least one processor and at least one memory including computer instructions, when executed by the at least one processor, cause the apparatus to: receive, by a user device from a network node, common control signaling via a plurality of beams periodically according to a predetermined beam sweeping pattern; receive, via a set of one or more beams in each of a plurality of sequential time-domain resources, an aperiodic downlink sounding burst; switch, by the user device, to a different receive beam for each of the sequential time-domain resources; and select, by the user device based on the received downlink sounding burst in each of the one or more time-domain resources, one or more beams to use for transmitting signals to or receiving signals from to the network node.

According to an example implementation, an apparatus includes means (e.g., 1002A/1002B and/or 1004, FIG. 10) for receiving, by a user device from a network node, common control signaling via a plurality of beams periodically according to a predetermined beam sweeping pattern; means (e.g., 1002A/1002B and/or 1004, FIG. 10) for receiving, via a set of one or more beams in each of a plurality of sequential time-domain resources, an aperiodic downlink sounding burst; means (e.g., 1002A/1002B and/or 1004, FIG. 10) for switching, by the user device, to a different receive beam for each of the sequential time-domain resources; and means (e.g., 1002A/1002B and/or 1004, FIG. 10) for selecting, by the user device based on the received downlink sounding burst in each of the one or more time-domain resources, one or more beams to use for transmitting signals to or receiving signals from to the network node.

According to an example implementation, a computer program product is provided that includes a computer-readable storage medium and storing executable code that, when executed by at least one data processing apparatus, is configured to cause the at least one data processing apparatus to perform a method including: receiving, by a user device from a network node, common control signaling via a plurality of beams periodically according to a predetermined beam sweeping pattern; receiving, via a set of one or more beams in each of a plurality of sequential time-domain resources, an aperiodic downlink sounding burst; switching, by the user device, to a different receive beam for each of the sequential time-domain resources; and selecting, by the user device based on the received downlink sounding burst in each of the one or more time-domain resources, one or more beams to use for transmitting signals to or receiving signals from to the network node.

Figure 10:
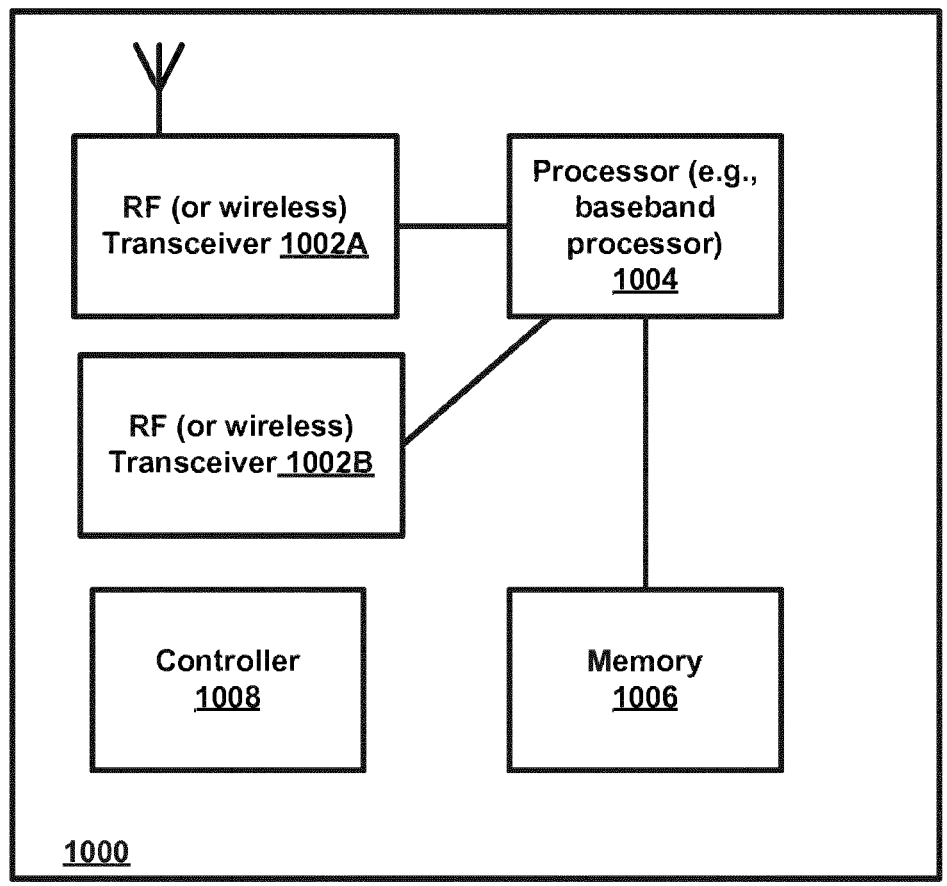
FIG. 10 is a block diagram of a wireless station (e.g., base station/access point or mobile station/user device) according to an example implementation.

FIG. 10 is a block diagram of a wireless station (e.g., AP or user device) 1000 according to an example implementation. The wireless station 1000 may include, for example, one or two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above.

Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 10, a controller (or processor) 808 may execute software and instructions, and may provide overall control for the station 1000, and may provide control for other systems not shown in FIG. 8, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example implementation, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (JOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising
at least one processor and at least one memory including computer instructions, when executed by the at least one processor, cause the apparatus to:
transmit common control signaling via a plurality of transmission beams periodically according to a predetermined beam sweeping pattern, wherein the common control signaling comprises control signaling transmitted to user devices within a cell to allow the user devices to detect cell specific beams of the cell; and
transmit, via a transmission beam of the plurality of transmission beams in each of a plurality of sequential time-domain resources, the transmission beam being the same for the plurality of sequential time-domain resources, an aperiodic downlink sounding burst to a user device for reception via a set of receiving beams of the user device in order to enable the user device to perform beamforming training.

2. The apparatus of claim 1 wherein a number of the sequential time-domain resources for the transmission of the downlink sounding burst is based on a number of transmit beams and/or receive beams of the at least one user device.

3. The apparatus of claim 1, wherein the transmitting, via the transmission beam in each of sequential time-domain resources, the aperiodic downlink sounding burst is triggered based on one of a plurality of triggering methods; and
wherein a number of the sequential time-domain resources for the transmission of the downlink sounding burst is based on the one of the plurality of triggering methods.

4. The apparatus of claim 1, wherein the transmission beam used to transmit the aperiodic downlink sounding burst is derived based on at least one of the user device triggering that triggers the transmitting the downlink sounding burst and an uplink channel measurement by the apparatus.

5. The apparatus of claim 1, wherein the transmitting, in each of the sequential time-domain resources, the aperiodic downlink sounding burst is triggered based on an occurrence of one of a plurality of triggering methods that include a first category of triggering methods and a second category of triggering methods; and
wherein a number of the sequential time-domain resources for the transmission of the downlink sounding burst is fixed for the first category of triggering methods, and is adjustable by the apparatus for the second category of triggering methods.

6. The apparatus of claim 5, wherein the first category of triggering methods comprises triggering the transmitting of the aperiodic downlink sounding burst in response to a random access preamble of a random access procedure; and
wherein the second category of triggering methods comprises triggering the transmitting the aperiodic downlink sounding burst in response to receiving at least one of the following: a handover message, a channel state information feedback, and a subsequent message of the random access procedure.

7. The apparatus of claim 1, wherein the computer instructions, when executed by the at least one processor, further cause the apparatus to:
transmit a list of a plurality of random access resources that includes a non-triggering resource that is not associated with triggering the transmission of the aperiodic downlink sounding burst, and a triggering resource that is associated with triggering the transmission of the aperiodic downlink sounding burst; and
receive, by the apparatus via the triggering resource, a random access preamble,
wherein the transmitting the aperiodic downlink sounding burst is triggered by the apparatus in response to receiving the random access preamble via the triggering resource.

8. The apparatus of claim 5, wherein the computer instructions, when executed by the at least one processor, further cause the apparatus to:
transmit scheduling information indicating the sequential time-domain resources for the transmission of the aperiodic downlink sounding burst to the user device upon detecting an occurrence of the second category of triggering methods; and
cause a transmission of the aperiodic downlink sounding burst to the user device according to the determined scheduling information.

9. The apparatus of claim 1, wherein the apparatus comprises a network node of a source cell of a handover, and wherein the computer instructions, when executed by the at least one processor, further cause the apparatus to:
receive, by the network node of the source cell, a handover message indicating a handover of the user device to the network node;
receive, by the network node of the source cell from a network node of a target cell of the handover, scheduling information indicating one or more resources of the target cell of the handover for transmission of the downlink sounding burst; and
send, by the network node of the source cell to the user device, the scheduling information for the transmission of the aperiodic downlink sounding burst by the network node of the target cell.

10. The apparatus of claim 1, wherein the apparatus comprises a network node of a target cell of a handover, and wherein the computer instructions, when executed by the at least one processor, further cause the apparatus to:
determine scheduling information indicating the plurality of sequential time-domain resources for the transmission of the aperiodic downlink sounding burst to the user device;
transmit the scheduling information to a network node of a source cell of the handover; and
cause a transmission of the aperiodic downlink sounding burst to the user device according to the determined scheduling information after the handover has been performed for the user device.

11. A method for beamforming training, comprising:
receiving, by a user device from a network node, common control signaling from a plurality of transmission beams according to a predetermined beam sweeping pattern, wherein the common control signaling comprises control signaling transmitted to user devices within a cell to allow the user devices to detect cell specific beams of the cell;
receiving, via one of a set of receiving beams in each of a plurality of sequential time-domain resources, an aperiodic downlink sounding burst from one of the plurality of transmission beams, the one of the plurality of transmission beams being the same for the plurality of sequential time-domain resources; and
performing beamforming training of the set of receiving beams based on the aperiodic downlink sounding burst to select a downlink receive beam from the set of receiving beams for receiving signals from the network node.

12. The method of claim 11, further comprising:
receiving a list of a plurality of random access resources that includes a non-triggering resource that is not associated with triggering the transmission of the aperiodic downlink sounding burst, and a triggering resource that is associated with triggering the transmission of the aperiodic downlink sounding burst; and
transmitting, by the user device to the network node via the triggering resource, a random access preamble,
wherein the receiving the aperiodic downlink sounding burst comprises receiving, via at least one of the set of receiving beams in each of a plurality of sequential time-domain resources, the aperiodic downlink sounding burst based on the transmission of the random access preamble via the triggering resource.

13. The method of claim 11, further comprising:
determining, by the user device, a group of N best beams or antenna ports of the network node based on the reception of the common control signaling; and
transmitting an indication of the group of N best beams or antenna ports to the network node.

14. The method of claim 11, further comprising:
transmitting, by the user device, an indication to the network node in order to instruct the network node to trigger a transmission of the aperiodic downlink sounding burst to the user device, wherein the indication is one of the following: a transmission of a random access preamble, a transmission of a further message in a random access procedure, a transmission of a channel state information feedback, and a transmission of a handover request.

15. The method of claim 14, further comprising:
receiving scheduling information from the network node after transmitting the indication, wherein the scheduling information indicates downlink resources for the reception, by the user device, of the aperiodic downlink sounding burst.

16. An apparatus comprising:
at least one processor and at least one memory including computer instructions, when executed by the at least one processor, cause the apparatus to:
receive, by a user device from a network node, common control signaling from a plurality of transmission beams according to a predetermined beam sweeping pattern, wherein the common control signaling comprises control signaling transmitted to user devices within a cell to allow the user devices to detect cell specific beams of the cell;
receive, via one of a set of receiving beams in each of a plurality of sequential time-domain resources, an aperiodic downlink sounding burst from one of the plurality of transmission beams, the one of the plurality of transmission beams being the same for the plurality of sequential time-domain resources; and
perform beamforming training of the set of receiving beams based on the aperiodic downlink sounding burst to select a downlink receive beam for receiving signals from the network node.

17. The apparatus of claim 16, wherein the computer instructions, when executed by the at least one processor, further cause the apparatus to:
receive a list of a plurality of random access resources that includes a non-triggering resource that is not associated with triggering the transmission of the aperiodic downlink sounding burst, and a triggering resource that is associated with triggering the transmission of the aperiodic downlink sounding burst; and
transmit, by the user device to the network node via the triggering resource, a random access preamble, wherein the receiving the aperiodic downlink sounding burst comprises receiving, via one of the set of receiving beams in each of a plurality of sequential time-domain resources, the aperiodic downlink sounding burst based on the transmission of the random access preamble via the triggering resource.

18. The apparatus of claim 16, wherein the computer instructions, when executed by the at least one processor, further cause the apparatus to:
determine, by the user device, a group of N best beams or antenna ports of the network node based on the reception of the common control signaling; and
transmit an indication of the group of N best beams or antenna ports to the network node.

19. The apparatus of claim 16, wherein the computer instructions, when executed by the at least one processor, further cause the apparatus to:
transmit, by the user device, an indication to the network node in order to instruct the network node to trigger a transmission of the aperiodic downlink sounding burst to the user device, wherein the indication is one of the following: a transmission of a random access preamble, a transmission of a further message in a random access procedure, a transmission of a channel state information feedback, and a transmission of a handover request.

20. The apparatus of claim 19, wherein the computer instructions, when executed by the at least one processor, further cause the apparatus to:
receive scheduling information from the network node after transmitting the indication, wherein the scheduling information indicates downlink resources for the reception, by the user device, of the aperiodic downlink sounding burst.

21. The apparatus of claim 1, wherein the apparatus is further caused to:
receive, a trigger indicating at least one of the following:
a number of instances of the aperiodic downlink sounding burst to be transmitted; or
an identifier of the transmission beam of the plurality of transmission beams.

* * * * *